United States Patent
Choi et al.

(10) Patent No.: US 11,574,626 B2
(45) Date of Patent: Feb. 7, 2023

(54) METHOD OF CONTROLLING INTELLIGENT SECURITY DEVICE

(71) Applicant: LG ELECTRONICS INC., Seoul (KR)

(72) Inventors: Changho Choi, Seoul (KR); Heesoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 16/996,404

(22) Filed: Aug. 18, 2020

(65) Prior Publication Data

US 2021/0142788 A1 May 13, 2021

(30) Foreign Application Priority Data

Nov. 13, 2019 (KR) .................. 10-2019-0145265

(51) Int. Cl.
*G10L 15/22* (2006.01)
*G10L 15/08* (2006.01)

(52) U.S. Cl.
CPC ........ *G10L 15/08* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| 10,297,250 B1* | 5/2019 | Blanksteen | G10L 15/32 |
|---|---|---|---|
| 10,356,362 B1* | 7/2019 | Rudberg | H04R 5/04 |
| 10,796,563 B1* | 10/2020 | Bell | G10L 15/22 |
| 11,145,081 B2* | 10/2021 | Yang | G08G 1/005 |
| 2002/0103582 A1* | 8/2002 | Ohmura | G07C 5/008 |
| | | | 701/31.4 |
| 2012/0166950 A1* | 6/2012 | Frumar | G06F 3/04847 |
| | | | 715/719 |
| 2015/0098523 A1* | 4/2015 | Lim | H04L 27/368 |
| | | | 375/297 |
| 2017/0105112 A1* | 4/2017 | Park | H04L 5/0048 |
| 2017/0227965 A1* | 8/2017 | Decenzo | G05D 1/0094 |
| 2017/0330447 A1* | 11/2017 | Mehta | H04L 67/12 |
| 2018/0115788 A1* | 4/2018 | Burns | G06V 20/41 |
| 2018/0152199 A1* | 5/2018 | Ma | G10L 19/08 |
| 2018/0253954 A1* | 9/2018 | Verma | G08B 25/08 |
| 2018/0322870 A1* | 11/2018 | Lee | H04N 21/4394 |
| 2018/0342329 A1* | 11/2018 | Rufo | G08B 25/10 |
| 2019/0026066 A1* | 1/2019 | Champy | G06F 3/162 |
| 2019/0311714 A1* | 10/2019 | Barbello | G06F 3/0484 |
| 2019/0392858 A1* | 12/2019 | Lee | G06F 3/165 |
| 2020/0105250 A1* | 4/2020 | Patel | G10L 15/07 |

(Continued)

*Primary Examiner* — Seong-Ah A Shin

(74) *Attorney, Agent, or Firm* — Birch, Stewart, Kolasch & Birch, LLP

(57) ABSTRACT

A method of controlling an intelligent security device can include capturing a video; collecting voice information included in the video; in response to determining that the voice information includes a wake-up word corresponding to a predetermined basic wake-up word for the intelligent security device, transmitting a spoken utterance included in the voice information to a smart device; receiving a command from the smart device, the command being generated based on information related to the spoken utterance; and executing an operation of the intelligent security device based on the command.

10 Claims, 18 Drawing Sheets

(56) References Cited

U.S. PATENT DOCUMENTS

2020/0152199 A1\* 5/2020 Chae ................. G10L 15/22
2020/0201521 A1\* 6/2020 Faulkner ............. G06F 3/0485
2022/0215664 A1\* 7/2022 Burns ................. H04N 7/185

\* cited by examiner

METHOD OF CONTROLLING INTELLIGENT SECURITY DEVICE

CROSS REFERENCE TO RELATED APPLICATIONS

This application claims the priority benefit of Korean Patent Application No. 10-2019-0145265, filed in the Republic of Korea on Nov. 13, 2019, which is incorporated herein by reference for all purposes as if fully set forth herein.

BACKGROUND OF THE INVENTION

Field of the Invention

The present disclosure relates to a method of controlling an intelligent security device.

Discussion of the Related Art

Home robot CCTVs have a function to talk to another party using only an existing voice.

The other party can merely try their best to predict a situation that is occurring in the home based on the voice and is forced to present an answer based on a prediction of what might be occurring in the home. Because the other party has to grasp all the possible situations that could be occurring based on the voice, he or she might not be able to give the correct answer to a person in the home who asked for help.

The other party receiving the voice requires a lot of time to understand the surrounding situation more accurately, and thus there exists a problem that he/she may miss an opportunity to timely respond in an emergency situation.

SUMMARY OF THE INVENTION

An object of the present disclosure is to address the above-described and other needs and/or problems.

Another object of the present disclosure is to provide a method of controlling an intelligent security device capable of adding a video projection function, maximizing security enhancement and convenience function using the video projection function, and providing disaster information and safety information.

In one aspect, there is provided a method of controlling an intelligent security device comprising capturing a video; collecting a voice in the captured video; if a basic wake-up word, that is previously determined as a wake-up word of the intelligent security device, is recognized in the collected voice, sending an utterance spoken from the voice to a predetermined smart device; and receiving, from the smart device, a command generated based on information related to the utterance and controlling an operation of the intelligent security device according to the command.

The sending may comprise recognizing the wake-up word and the utterance spoken subsequent to the wake-up word or the utterance and the wake-up word spoken subsequent to the utterance from the voice; and sending, to the smart device, a learning video including the recognized wake-up word or utterance, the utterance, and the wake-up word.

The recognizing of the wake-up word may further comprise determining whether the wake-up word is recognized as the wake-up word of the intelligent security device using a wake-up word recognition model learned based on the basic wake-up word.

The sending may further comprise if the learning video is sent to the smart device, outputting a notification signal to the smart device; releasing the notification signal before a threshold time after the notification signal is output; and if the notification signal of the smart device is released, displaying the learning video on a screen of the smart device.

The method may further comprise, if the learning video is displayed on the screen of the smart device, generating the command based on information related to space objects, that have been previously learned through the learning video, and information related to the utterance.

The generating of the command may comprise touching one of the learned space objects; and controlling to project a predetermined video on the touched space object.

The generating of the command may comprise speaking a name for the learned space object with a user's voice; and controlling to project a predetermined video on the space object matched to the spoken user's voice.

The generating of the command may comprise inputting a name for the learned space object in text; and controlling to project a predetermined video on the space object matched to the input text.

The touching of one of the learned space objects may be at least one of a flicking operation or a pitching operation on the screen of the smart device.

The may further comprise, if the space object is a predetermined electronic device, clicking the electronic device displayed on the screen of the smart device to control an operation of the electronic device.

The command may include a motion command that allows the intelligent security device to move to the space object or around the space object.

The predetermined video may be a video stored in the smart device, or a video stored in a cloud or a server connected through wireless communication under the control of the smart device.

The method may further comprise receiving, from a network, downlink control information (DCI) that is used to schedule a transmission of the voice collected from the video obtained by a camera included in the intelligent security device; and sending the voice to the network based on the DCI.

The method may further comprise performing an initial access procedure with the network based on a synchronization signal block (SSB); and sending the voice to the network via a physical uplink shared channel (PUSCH), in which the SSB and a DM-RS of the PUSCH are QCLed for QCL type D.

The method may further comprise controlling a transceiver to send the voice to an AI processor included in the network; and controlling the transceiver to receive AI-processed information from the AI processor, in which the AI-processed information is information that determines whether the wake-up word or the utterance recognized from the voice is recognized as the wake-up word or the utterance of the intelligent security device.

Effects of a method of controlling an intelligent security device according to an embodiment of the present disclosure are described as follows.

The present disclosure can provide disaster information and safety information by adding a video projection function and maximizing security enhancement and convenience function using the video projection function.

The present disclosure can remotely control an intelligent security device and home appliances on a video provided through the intelligent security device.

The present disclosure can provide information in real time, that the other party requests remotely, through an intelligent security device.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompany drawings, which are included to provide a further understanding of the present disclosure and are incorporated on and constitute a part of the present specification illustrate embodiments of the present disclosure and together with the description serve to explain the principles of the present disclosure.

DETAILED DESCRIPTION OF THE EMBODIMENTS

Figure 1:
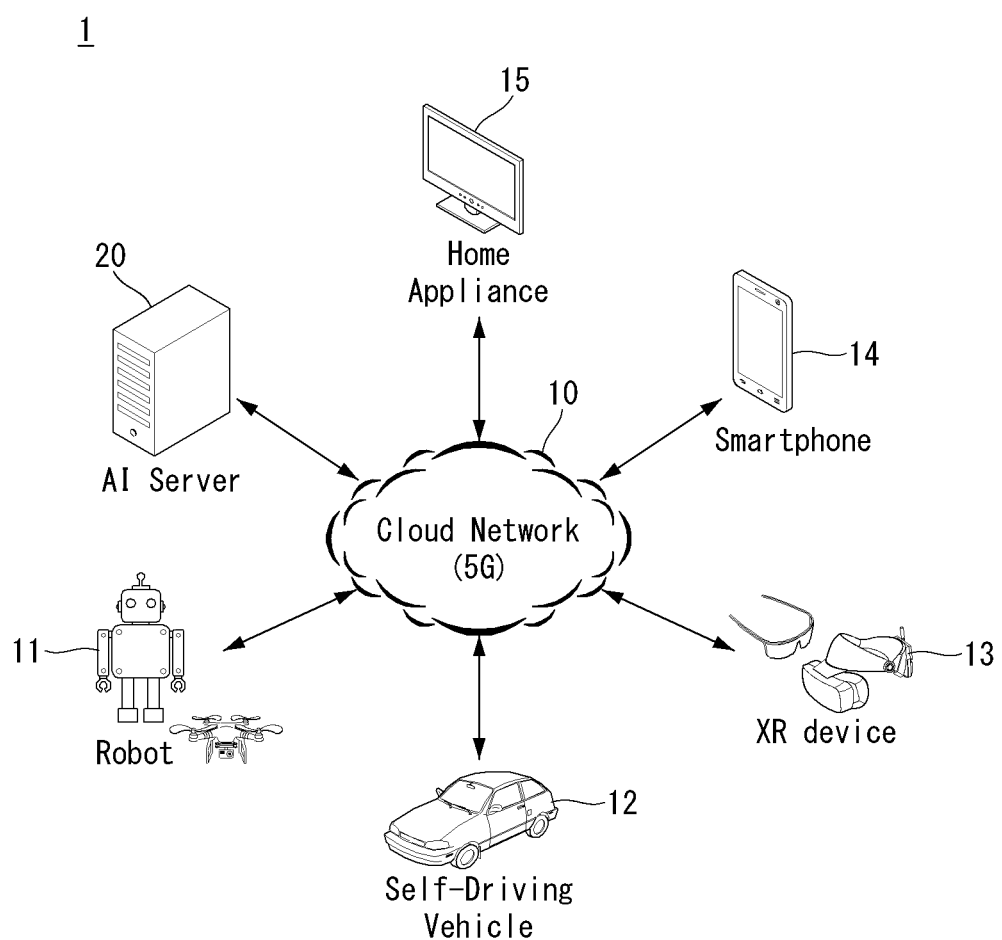
FIG. 1 is a conceptual diagram illustrating an AI device according to an embodiment of the present disclosure.

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first," "second," etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

Three major requirement areas of 5G include (1) an enhanced mobile broadband (eMBB) area, (2) a massive machine type communication (mMTC) area, and (3) ultra-reliable and low latency communications (URLLC) area.

Some use cases may require multiple areas for optimization, and other use cases may be focused to only one key performance indicator (KPI). 5G supports these various use cases in a flexible and reliable manner.

The EMBB enables far beyond basic mobile Internet access and covers media and entertainment applications in rich interactive work, cloud or augmented reality. Data is one of key dynamic power of 5G, and in a 5G era, a dedicated voice service may not be seen for the first time. In 5G, a voice is expected to be treated as an application program using data connection simply provided by a communication system. Main reasons for an increased traffic volume are increase in content size and increase in the number of applications requiring a high data transmission rate. Streaming services (audio and video), interactive video, and mobile Internet connections will be used more widely as more devices connect to Internet. These many application programs require always-on connectivity in order to push real-time information and notifications to a user. Cloud storage and applications are growing rapidly in mobile communication platforms, which may be applied to both work and entertainment. Cloud storage is a special use case that drives growth of uplink data transmission rates. 5G is also used for remote tasks in cloud and requires much lower end-to-end delays to maintain excellent user experience when tactile interfaces are used. Entertainment, for example, cloud gaming and video streaming is another key factor in increasing the need for mobile broadband capabilities. Entertainment is useful in smartphones and tablets at anywhere including in high mobility environments such as trains, cars and airplanes. Another use case is augmented reality and information search for entertainment. Here, augmented reality requires very low latency and instantaneous amount of data.

Further, one of most anticipated 5G use cases relates to a function, e.g., mMTC that can smoothly connect embedded sensors in all fields. By 2020 year, potential IoT devices are expected to reach 20.4 billion. Industrial IoT is one of areas in which 5G plays a major role in enabling smart cities, asset tracking, smart utilities, and agriculture and security infrastructure.

URLLC includes new services to transform an industry through ultra-reliable/available low latency links, such as remote control of major infrastructure and self-driving vehicles. A level of reliability and latency is useful for smart grid control, industrial automation, robotics, drone control, and coordination.

Hereinafter, a number of use cases are described in more detail.

5G may complement fiber-to-the-home (FTTH) and cable-based broadband (or DOCSIS) as a means of providing streams that are rated at hundreds of megabits per second to gigabits per second. Such a high speed is required to deliver televisions with a resolution of 4K or more (6K, 8K, and more) as well as virtual reality and augmented reality. Virtual Reality (VR) and Augmented Reality (AR) applications include nearly immersive sporting events. A specific application program may require a special network setting. For example, for VR games, in order to minimize latency, game companies may need to integrate core servers with an edge network server of a network operator.

An automotive is expected to become important new dynamic power for 5G together with many use cases for mobile communication to vehicles. For example, entertainment for passengers requires simultaneous high capacity and high mobility mobile broadband. This is because future users continue to expect high quality connections regardless of a position and speed thereof. Another use case of an automotive sector is an augmented reality dashboard. This identifies objects in the dark above what a driver views through a front window and overlays and displays information that notifies the driver about a distance and movement of the object. In the future, wireless modules enable communication between vehicles, exchange of information between a vehicle and a supporting infrastructure, and exchange of information between a vehicle and other connected devices (e.g., devices carried by pedestrians). A safety system guides alternative courses of an action to enable drivers to safer drive, thereby reducing the risk of an accident. The next step will be a remotely controlled or self-driven vehicle. This requires very reliable and very fast communication between different self-driving vehicles and between automobiles and infrastructure. In the future, self-driving vehicles will perform all driving activities and the driver will focus on traffic anomalies that the vehicle itself cannot identify. The technical requirements of self-driving vehicles require ultra-low latency and ultra-fast reliability to increase traffic safety to an unachievable level.

Smart cities and smart homes, referred to as smart societies, will be embedded in a high-density wireless sensor network. A distributed network of intelligent sensors will identify conditions for a cost and energy-efficient maintenance of a city or a home. Similar settings may be made for each family. Temperature sensors, window and heating controllers, burglar alarms and home appliances are all connected wirelessly. These many sensors are typically low data rates, low power and low cost. However, for example, real-time HD video may be required in a specific type of device for surveillance.

Consumption and distribution of energy including a heat or a gas is highly decentralized, thereby requiring automated control of distributed sensor networks. Smart grids interconnect these sensors using digital information and communication technology to collect information and act accordingly. The information may include a behavior of suppliers and consumers, allowing smart grids to improve distribution of fuels such as electricity in efficiency, reliability, economics, sustainability of production, and in an automated manner. Smart grid may be viewed as another sensor network with low latency.

A health sector has many application programs that can benefit from mobile communication. The communication system may support telemedicine that provides clinical care at a far distance. This may help reduce barriers to distance and improve access to healthcare services that are not consistently available in remote rural areas. It is also used for saving lives in important care and emergency situations. A mobile communication based wireless sensor network may provide remote monitoring and sensors for parameters such as a heart rate and a blood pressure.

Wireless and mobile communication is becoming gradually important in an industrial application field. A wiring requires a highly installing and maintaining cost. Therefore, the possibility of replacing with a wireless link that can reconfigure a cable is an attractive opportunity in many industry fields. However, achieving this requires that a wireless connection operates with reliability, capacity, and delay similar to a cable and that management is simplified. Low latency and very low error probability are new requirements that need to be connected in 5G.

Logistics and freight tracking are important use cases for mobile communication that enable tracking of inventory and packages at anywhere using a position-based information system. A use case of logistics and freight tracking typically requires a low data rate, but requires reliable position information and a wide range.

The present disclosure to be described later in the present specification may be implemented by combining or changing each embodiment to satisfy the requirements of the above-described 5G.

FIG. 1 is a conceptual diagram illustrating an embodiment of an AI device.

Referring to FIG. 1, in an AI system, at least one of an AI server 20, a robot 11, an autonomous vehicle 12, an XR device 13, a smartphone 14, or a home appliance 15 is connected to a cloud network 10. Here, the robot 11, the autonomous vehicle 12, the XR device 13, the smartphone 14, or the home appliance 15 to which AI technology is applied may be referred to as AI devices 11 to 15.

The cloud network 10 may mean a network that configures part of a cloud computing infrastructure or that exists inside a cloud computing infrastructure. Here, the cloud network 10 may be configured using a 3G network, a 4G network, a long term evolution (LTE) network, or a 5G network.

That is, each device 11 to 15 and 20 constituting the AI system may be connected to each other through the cloud network 10. In particular, each of the devices 11 to 15 and 20 may communicate with each other through a base station, but may directly communicate with each other without passing through a base station.

The AI server 20 may include a server that performs AI processing and a server that performs operations on big data.

The AI server 20 may be connected to at least one of the robot 11, the autonomous vehicle 12, the XR device 13, the smartphone 14, or the home appliance 15, which are AI devices constituting the AI system through the cloud network 10 and may help at least some of AI processing of the connected AI devices 11 to 15.

In this case, the AI server 20 may learn an artificial neural network according to machine learning algorithm instead of the AI devices 11 to 15 and directly store a learning model or transmit a learning model to the AI devices 11 to 15.

In this case, the AI server 20 may receive input data from the AI devices 11 to 15, infer a result value of the input data received using a learning model, and generate a response or a control command based on the inferred result value to transmit the response or the control command to the AI device s11 and 15.

Alternatively, the AI devices 11 to 15 may directly infer a result value of the input data using a learning model and generate a response or a control command based on the inferred result value.

<AI+Robot>

AI technology is applied to the robot 11, and the robot 11 may be implemented into a guide robot, a transport robot, a cleaning robot, a wearable robot, an entertainment robot, a pet robot, an unmanned aerial robot, or the like.

The robot 11 may include a robot control module for controlling an operation, and the robot control module may mean a software module or a chip implemented in hardware.

The robot 11 may obtain status information of the robot 11 using sensor information obtained from various kinds of sensors, detect (recognize) a surrounding environment and an object, generate map data, determine a moving route and a driving plan, determine a response to a user interaction, or determine an operation.

Here, in order to determine a movement route and a driving plan, the robot 11 may use sensor information obtained from a sensor of at least one of rider, radar, and a camera.

The robot 11 may perform the above operation using a learning model configured with at least of one artificial neural network. For example, the robot 11 may recognize a surrounding environment and an object using a learning model, and determine an operation using the recognized surrounding environment information or object information. Here, the learning model may be directly learned by the robot 11 or may be learned by an external device such as the AI server 20.

In this case, by generating a result directly using a learning model, the robot 11 may perform an operation, but may transmit sensor information to an external device such as the AI server 20 and receive the generated result and perform an operation.

The robot 11 may determine a movement route and a driving plan using at least one of map data, object information detected from sensor information, or object information obtained from an external device, and control a driver to drive the robot 11 according to the determined movement route and driving plan.

The map data may include object identification information about various objects disposed in a space in which the robot 11 moves. For example, the map data may include object identification information about fixed objects such as walls and doors and movable objects such as flower pots and desks. The object identification information may include a name, a kind, a distance, and a position.

Further, by controlling the driver based on the control/interaction of a user, the robot 11 may perform an operation or may drive. In this case, the robot 11 may obtain intention information of an interaction according to the user's motion or voice utterance, and determine a response based on the obtained intention information to perform an operation.

<AI+Autonomous Vehicle>

AI technology is applied to the autonomous vehicle 12 and thus the autonomous vehicle 12 may be implemented into a mobile robot, a vehicle, an unmanned aerial vehicle, or the like.

The autonomous vehicle 12 may include an autonomous driving control module for controlling an autonomous driving function, and the autonomous driving control module may mean a software module or a chip implemented in hardware. The autonomous driving control module may be included inside the autonomous vehicle 12 as a configuration of the autonomous vehicle 12, but may be configured as a separate hardware to be connected to the outside of the autonomous vehicle 12.

The autonomous vehicle 12 may obtain status information thereof using sensor information obtained from various types of sensors, detect (recognize) a surrounding environment and object, generate map data, determine a moving route and a driving plan, or determine an operation.

Here, in order to determine a movement route and a driving plan, the autonomous vehicle 12 may use sensor information obtained from a sensor of at least one of rider, radar, and a camera, similar to the robot 11.

In particular, the autonomous vehicle 12 may recognize an environment or an object about an area in which a field of view is covered or an area of a predetermined distance or more by receiving sensor information from external devices or may directly receive recognized information from external devices.

The autonomous vehicle 12 may perform the above-described operations using a learning model configured with at least one artificial neural network. For example, the autonomous vehicle 12 may recognize a surrounding environment and an object using a learning model, and determine a driving route using the recognized surrounding environment information or object information. Here, the learning model may be learned directly from the autonomous vehicle 12 or may be learned from an external device such as the AI server 20.

In this case, by generating a result directly using a learning model, the autonomous vehicle 12 may perform an operation, but transmit sensor information to an external device such as the AI server 20 and thus receive the generated result to perform an operation.

The autonomous vehicle 12 may determine a moving route and a driving plan using at least one of map data, object information detected from sensor information, or object information obtained from an external device, and controls the driver to drive the autonomous vehicle 12 according to the determined moving route and driving plan.

The map data may include object identification information about various objects disposed in a space (e.g., road) in which the autonomous vehicle 12 drives. For example, the map data may include object identification information about fixed objects such as street lights, rocks, buildings, and movable objects such as vehicles and pedestrians. The object identification information may include a name, a kind, a distance, a position, and the like.

Further, by controlling the driver based on a user's control/interaction, the autonomous vehicle 12 may perform an operation or may drive. In this case, the autonomous vehicle 12 may obtain intention information of an interaction according to the user's motion or voice utterance, and determine a response based on the obtained intention information to perform an operation.

<AI+XR>

AI technology is applied to the XR device 13 and thus the XR device 13 may be implemented into a head-mount display (HMD), a head-up display (HUD) installed in a vehicle, a television, a mobile phone, a smartphone, a computer, a wearable device, a home appliance, digital signage, a vehicle, a fixed robot, or a mobile robot.

The XR device 13 may analyze three-dimensional point cloud data or image data obtained through various sensors or from an external device to generate position data and attribute data of the three-dimensional points, thereby obtaining information about a surrounding space or a reality object and rendering and outputting an XR object to output. For example, the XR device 13 may output an XR object including additional information about the recognized object to correspond to the recognized object.

The XR device 13 may perform the above-described operations using a learning model configured with at least one artificial neural network. For example, the XR device 13 may recognize a real object in 3D point cloud data or image data using the learning model, and provide information corresponding to the recognized real object. Here, the learning model may be learned directly from the XR device 13 or may be learned from an external device such as the AI server 20.

In this case, by generating a result directly using a learning model, the XR device 13 may perform an operation, but transmit sensor information to an external device such as the AI server 20 and receive the generated result to perform an operation.

<AI+Robot+Autonomous Driving>

AI technology and autonomous driving technology are applied to the robot 11 and thus the robot 11 may be implemented into a guide robot, a transport robot, a cleaning robot, a wearable robot, an entertainment robot, a pet robot, an unmanned aerial robot, or the like.

The robot 11 to which AI technology and autonomous driving technology are applied may mean a robot having an autonomous driving function or a robot 11 interacting with the autonomous vehicle 12.

The robot 11 having an autonomous driving function may be collectively referred to as devices that moves by themselves according to a given moving route without a user's control or that determine and move a moving route by themselves.

In order to determine at least one of a movement route or a driving plan, the robot 11 and the autonomous vehicle 12 having an autonomous driving function may use a common sensing method. For example, the robot 11 and the autonomous vehicle 12 having the autonomous driving function may determine at least one of a movement route or a driving plan using information sensed through lidar, radar, and the camera.

While the robot 11 interacting with the autonomous vehicle 12 exists separately from the autonomous vehicle 12, the robot 11 may be linked to an autonomous driving function inside or outside the autonomous vehicle 12 or may perform an operation connected to a user who rides in the autonomous vehicle 12.

In this case, the robot 11 interacting with the autonomous vehicle 12 may obtain sensor information instead of the autonomous vehicle 12 to provide the sensor information to the autonomous vehicle 12 or may obtain sensor information and generate surrounding environment information or object information to provide the surrounding environment information or the object information to the autonomous vehicle 12, thereby controlling or assisting an autonomous driving function of the autonomous vehicle 12.

Alternatively, the robot 11 interacting with the autonomous vehicle 12 may monitor a user who rides in the autonomous vehicle 12 or may control a function of the autonomous vehicle 12 through an interaction with the user. For example, when it is determined that a driver is in a drowsy state, the robot 11 may activate an autonomous driving function of the autonomous vehicle 12 or assist the control of the driver of the autonomous vehicle 12. Here, the function of the autonomous vehicle 12 controlled by the robot 11 may include a function provided by a navigation system or an audio system provided inside the autonomous vehicle 12 as well as an autonomous driving function.

Alternatively, the robot 11 interacting with the autonomous vehicle 12 may provide information from the outside of the autonomous vehicle 12 to the autonomous vehicle 12 or assist a function of the autonomous vehicle 12. For example, the robot 11 may provide traffic information including signal information to the autonomous vehicle 12 as in a smart traffic light and interact with the autonomous vehicle 12 to automatically connect an electric charger to a charging port, as in an automatic electric charger of an electric vehicle.

<AI+Robot+XR>

AI technology and XR technology are applied to the robot 11, and the robot 11 may be implemented into a guide robot, a transport robot, a cleaning robot, a wearable robot, an entertainment robot, a pet robot, an unmanned aerial robot, a drone, or the like.

The robot 11 to which the XR technology is applied may mean a robot to be an object of control/interaction in an XR image. In this case, the robot 11 may be distinguished from the XR device 13 and be interworked with the XR device 13.

When the robot 11 to be an object of control/interaction in the XR image obtains sensor information from sensors including a camera, the robot 11 or the XR device 13 generates an XR image based on the sensor information, and the XR device 13 may output the generated XR image. The robot 11 may operate based on a control signal input through the XR device 13 or a user interaction.

For example, the user may check an XR image corresponding to a viewpoint of the robot 11 remotely linked through an external device such as the XR device 13, and adjust an autonomous driving route of the robot 11 through an interaction, control an operation or driving of the robot 11, or check information of a surrounding object.

<AI+Autonomous Vehicle+XR>

AI technology and XR technology are applied to the autonomous vehicle 12, and the autonomous vehicle 12 may be implemented into a mobile robot, a vehicle, an unmanned aerial vehicle, and the like.

The autonomous vehicle 12 to which XR technology is applied may mean an autonomous vehicle having a means for providing an XR image or an autonomous vehicle to be an object of control/interaction in the XR image. In particular, the autonomous vehicle 12 to be an object of control/interaction in the XR image may be distinguished from the XR device 13 and be interworked with the XR device 13.

The autonomous vehicle 12 having a means for providing an XR image may obtain sensor information from sensors including a camera, and output an XR image generated based on the obtained sensor information. For example, by having an HUD and outputting an XR image, the autonomous vehicle 12 may provide an XR object corresponding to a real object or an object on a screen to an occupant.

In this case, when the XR object is output to the HUD, at least a part of the XR object may be output to overlap with the actual object to which the occupant's eyes are directed. However, when the XR object is output to the display provided inside the autonomous vehicle 12, at least a part of the XR object may be output to overlap with an object on the screen. For example, the autonomous vehicle 12 may output XR objects corresponding to objects such as a road, another vehicle, a traffic light, a traffic sign, a motorcycle, a pedestrian, a building, and the like.

When the autonomous vehicle 12 to be an object of control/interaction in the XR image obtains sensor information from sensors including a camera, the autonomous vehicle 12 or the XR device 13 may generate an XR image based on the sensor information, and the XR device 13 may output the generated XR image. The autonomous vehicle 12 may operate based on a user's interaction or a control signal input through an external device such as the XR device 13.

EXtended Reality (XR) collectively refers to Virtual Reality (VR), Augmented Reality (AR), and Mixed Reality (MR). VR technology is computer graphic technology that provides an object or a background of a real world only to CG images, AR technology is computer graphic technology that together provides virtual CG images on real object images, and MR technology is computer graphic technology that provides by mixing and combining virtual objects in a real world.

MR technology is similar to AR technology in that it shows both a real object and a virtual object. However, there is a difference in that in AR technology, a virtual object is used in the form of supplementing a real object, but in MR technology, a virtual object and a real object are used in an equivalent nature.

XR technology may be applied to a Head-Mount Display (HMD), a Head-Up Display (HUD), a mobile phone, a tablet PC, a laptop computer, a desktop computer, a television, digital signage, etc. and a device to which XR technology is applied may be referred to an XR device.

A. Example of block diagram of UE and 5G network

Figure 2:
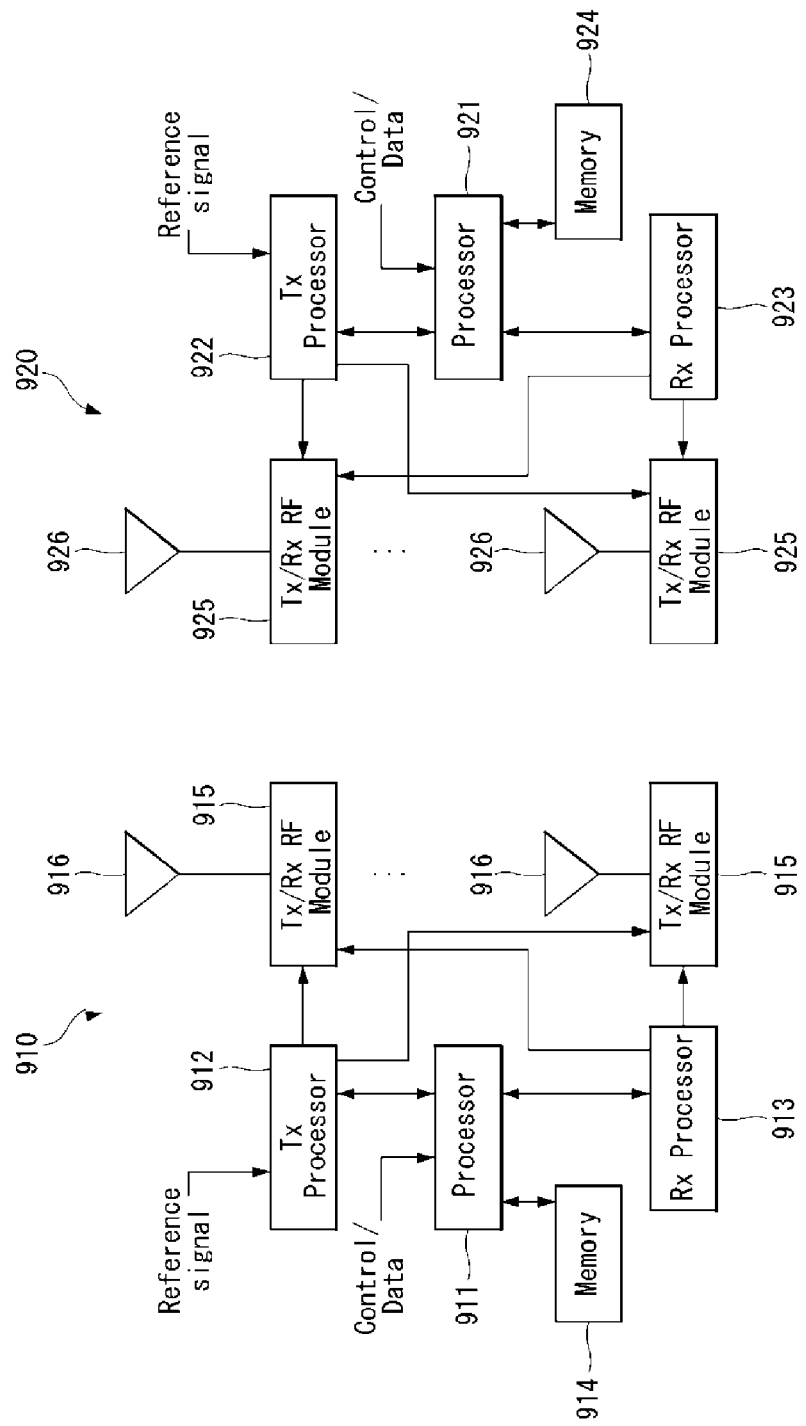
FIG. 2 is a block diagram illustrating a wireless communication system according to an embodiment of the present disclosure.

FIG. 2 is a block diagram of a wireless communication system to which methods proposed in the disclosure are applicable.

Referring to FIG. 2, a device (AI device) including an AI module is defined as a first communication device (910 of FIG. 2), and a processor 911 can perform detailed autonomous operations.

A 5G network including another device (AI server) communicating with the AI device is defined as a second communication device (920 of FIG. 2), and a processor 921 can perform detailed autonomous operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (e.g., physical layer) in DL (communication from the first communication device to the second communication device). The Rx processor implements various signal processing functions of L1 (e.g., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 3:
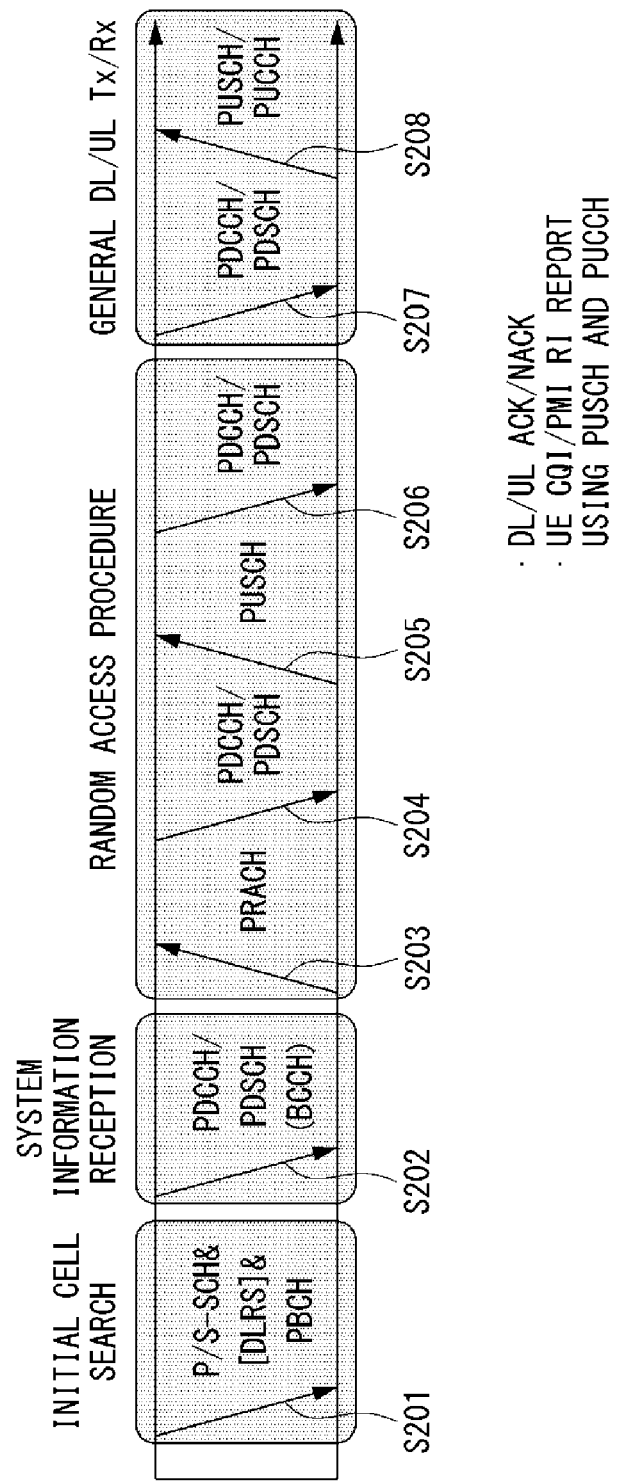
FIG. 3 is a diagram illustrating an example of a signal transmitting/receiving method in a wireless communication system according to an embodiment of the present disclosure.

FIG. 3 is a diagram showing an example of a signal transmission/reception method in a wireless communication system.

In a wireless communication system, a UE receives information from a base station through downlink (DL), and the UE transmits information to the base station through uplink (UL). The information transmitted and received by the base station and the UE includes data and various control information, and various physical channels exist according to a kind/use of information in which the base station and the UE transmit and receive.

When power of the UE is turned on or when the UE newly enters to a cell, the UE performs an initial cell search operation of synchronizing with the base station (S201). For this reason, the UE may receive a primary synchronization signal (PSS) and a secondary synchronization signal (SSS) from the base station to be synchronized with the base station and obtain information such as cell ID. Thereafter, the UE may receive a physical broadcast channel (PBCH) from the base station to obtain broadcast information within the cell. The UE may receive a downlink reference signal (DL RS) in an initial cell search step to check a downlink channel status.

The UE, having finished initial cell search may receive a physical downlink shared channel (PDSCH) according to a physical downlink control channel (PDCCH) and information loaded in the PDCCH to obtain more specific system information (S202).

When the UE first accesses to the base station or when there is no radio resource for signal transmission, the UE may perform a random access procedure (RACH) to the base station (S203 to S206). For this reason, the UE may transmit a specific sequence to a preamble through a physical random access channel (PRACH) (S203 and S205) and receive a random access response (RAR) message to the preamble through the PDCCH and the PDSCH corresponding thereto. In the case of a contention-based RACH, the UE may additionally perform a contention resolution procedure (S206).

The UE, having performed the above process may perform PDCCH/PDSCH reception (S207) and physical uplink shared channel (PUSCH)/physical uplink control channel (PUCCH) transmission (S208) as a general uplink/downlink signal transmission procedure. In particular, the UE receives downlink control information (DCI) through the PDCCH. Here, the DCI includes control information such as resource allocation information for the UE and may be applied in different formats according to a use purpose.

Control information transmitted by the UE to the base station through uplink or received by the UE from the base station may include a downlink/uplink ACK/NACK signal, a channel quality indicator (CQI), a precoding matrix index (PMI), and a rank indicator (RI). The UE may transmit control information such as the above-described CQI/PMI/RI through a PUSCH and/or a PUCCH.

The UE monitors a set of PDCCH candidates at monitoring occasions set to at least one control element sets (CORESETs) on a serving cell according to the corresponding search space configurations. A set of PDCCH candidates to be monitored by the UE is defined in terms of search space sets, and the search space sets may be a common search space set or a UE-specific search space set. The CORESET is configured with a set of (physical) resource blocks having time duration of 1 to 3 OFDM symbols. The network may set the UE to have a plurality of CORESETs. The UE monitors PDCCH candidates in at least one search space sets. Here, monitoring means attempting to decode the PDCCH candidate(s) in the search space. When the UE succeeds in decoding one of PDCCH candidates in a search space, the UE determines that the PDCCH has been detected in the corresponding PDCCH candidate, and performs PDSCH reception or PUSCH transmission based on DCI in the detected PDCCH. The PDCCH may be used for scheduling DL transmissions on the PDSCH and UL transmissions on the PUSCH. Here, DCI on the PDCCH includes a downlink assignment (e.g., downlink grant (DL grant)) including at least modulation and coding format and resource allocation information related to a downlink shared channel or uplink grant (UL grant) including modulation and coding format and resource allocation information related to an uplink shared channel.

An initial access (IA) procedure in a 5G communication system will be additionally described with reference to FIG. 3.

The UE can perform cell search, system information acquisition, beam alignment for initial access, and DL measurement based on an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (e.g., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission based on most recent pathloss and a power ramping counter.

The UE can perform UL transmission through Msg3 of the random access procedure over a physical uplink shared channel based on the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS based on the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted based on SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequency Sect.

The UE receives DCI format 2_1 from the BS based on the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data based on signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Using 5G Communication

Figure 4:
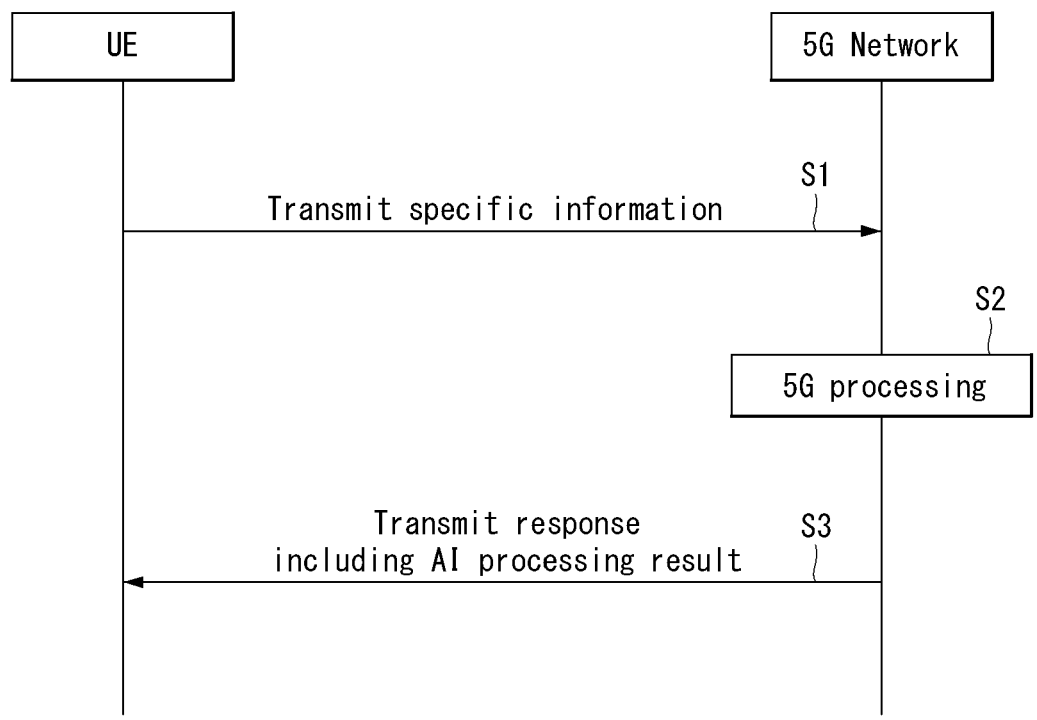
FIG. 4 illustrates an example of a basic operation of a user terminal and a 5G network in a 5G communication system according to an embodiment of the present disclosure.

FIG. 4 shows an example of basic operations of an UE and a 5G network in a 5G communication system.

The UE transmits specific information to the 5G network (S1). The 5G network may perform 5G processing related to the specific information (S2). Here, the 5G processing may include AI processing. And the 5G network may transmit response including AI processing result to UE(S3).

G. Applied Operations Between UE and 5G Network in 5G Communication System

Hereinafter, the operation of an AI using 5G communication will be described in more detail with reference to wireless communication technology (BM procedure, URLLC, mMTC, etc.) described in FIGS. 2 and 3.

First, a basic procedure of an applied operation to which a method proposed by the present disclosure which will be described later and eMBB of 5G communication are applied will be described.

As in steps S1 and S3 of FIG. 4, the UE performs an initial access procedure and a random access procedure with the 5G network prior to step S1 of FIG. 4 in order to transmit/receive signals, information and the like to/from the 5G network.

More specifically, the UE performs an initial access procedure with the 5G network based on an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information. Accordingly, the UE transmits the specific information to the 5G network based on the UL grant. In addition, the 5G network transmits, to the UE, a DL grant for scheduling transmission of 5G processing results with respect to the specific information. Accordingly, the 5G network can transmit, to the UE, information (or a signal) related to remote control based on the DL grant.

Next, a basic procedure of an applied operation to which a method proposed by the present disclosure which will be described later and URLLC of 5G communication are applied will be described.

As described above, an UE can receive DownlinkPreemption IE from the 5G network after the UE performs an initial access procedure and/or a random access procedure with the 5G network. Then, the UE receives DCI format 2_1 including a preemption indication from the 5G network based on DownlinkPreemption IE. The UE does not perform (or expect or assume) reception of eMBB data in resources (PRBs and/or OFDM symbols) indicated by the preemption indication. Thereafter, when the UE needs to transmit specific information, the UE can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the UE receives a UL grant from the 5G network in order to transmit specific information to the 5G network. Here, the UL grant may include information on the number of repetitions of transmission of the specific information and the specific information may be repeatedly transmitted based on the information on the number of repetitions. That is, the UE transmits the specific information to the 5G network based on the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 5:
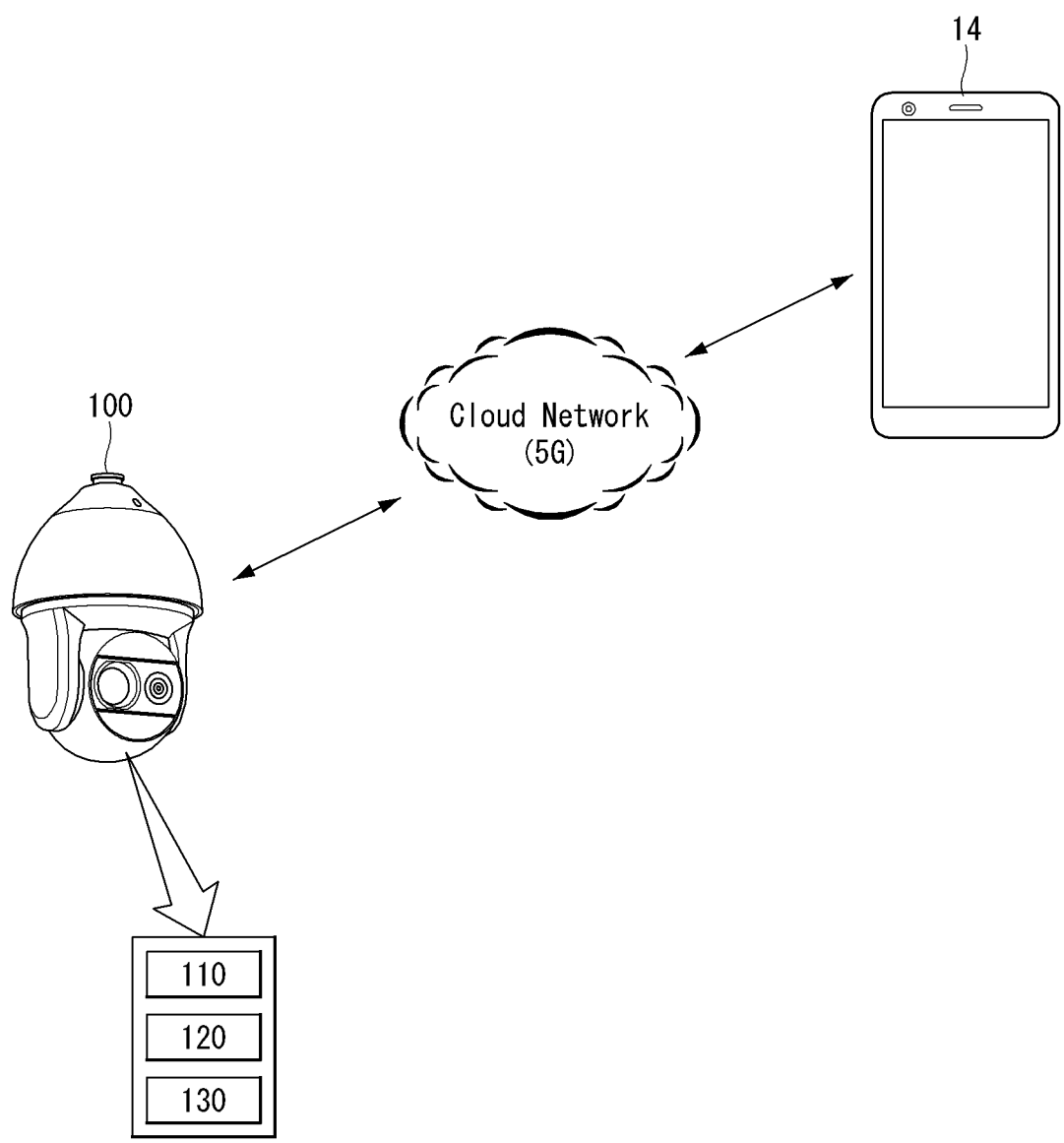
FIG. 5 illustrates a smart device and an intelligent security device according to an embodiment of the present disclosure.

FIG. 5 illustrates an intelligent security device according to an embodiment of the present disclosure.

Referring to FIG. 5, an intelligent security device 100 according to an embodiment of the present disclosure may be electrically connected to a smart device 14 over a 5G network and transmit or receive information or data to or from the smart device 14.

The intelligent security device 100 may include a processor 110, a transceiver 120, and a camera 130.

The camera 130 may be mounted on a body of the intelligent security device 100. At least one camera 130 may be mounted on a body of the intelligent security device 100. The camera 130 may capture a predetermined range or area. The plurality of cameras 130 may be mounted toward different directions to capture different ranges or areas. Alternatively, the plurality of cameras 130 may have different functions. For example, the camera 130 may include a plurality of closed circuit television (CCTV) cameras, a plurality of infrared thermal sensor cameras, and the like.

One of the plurality of cameras 130 disposed in the substantially same direction may zoom in an object and capture a small area. Another camera of the plurality of cameras 130 may zoom out an object and capture a large area.

The camera 130 may provide a video taken in real time to the processor 110 or a memory to be described below.

The processor 110 may acquire frame information based on the video taken by the camera 130. The processor 110 may be electrically connected to the camera 130, the transceiver 120, the memory to be described below, and a power supply unit and may exchange signals with them. The processor 110 may be implemented using at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, or electrical units for performing other functions.

The processor 110 may be driven by power provided by the power supply unit to be described below. The processor 110 may receive and process data, generate signals, and provide the signals in a state where power is provided by the power supply unit.

The transceiver 120 may transmit the captured video and voice information to the smart device 14 and receive, from the smart device 14, a command that can be executed by the processor 110. However, the present disclosure is not limited thereto, and the transceiver 120 may exchange signals with a server located outside the intelligent security device 100 or another device. For example, the transceiver 120 may exchange signals with at least one of an infrastructure (e.g., server, cloud), the smart device 14, or a terminal. The transceiver 120 may include at least one of a transmission antenna, a reception antenna, a radio frequency (RF) circuit capable of implementing various communication protocols, and a RF element, in order to perform communication.

The smart device 14 may receive frame information from the intelligent security device 100 and display it. The frame information may include video information and voice information of a predetermined range or area captured by the camera 130. The smart device 14 may generate a command capable of controlling the displayed frame information and send the generated command to the transceiver 120.

The smart device 14 may store the frame information received from the transceiver 120 in a main processor 110 connected to the 5G network.

The main processor 110 may learn a neural network for recognizing a variety of information related to the frame information based on the frame information.

Here, the neural network for recognizing a variety of information related to the frame information based on the frame information may be designed to emulate a human brain structure on a computer and may include a plurality of network nodes with weight that emulates neurons of a human neural network.

The plurality of network nodes may transmit and receive data according to each connection relationship so that neurons emulate the synaptic activity of neurons sending and receiving signals through synapses. Here, the neural network may include a deep learning model which has evolved from a neural network model. In the deep learning model, the plurality of network nodes may be arranged in different layers and may transmit and receive data according to a convolution connection relationship. Examples of the neural network model may include various deep learning techniques, such as deep neural networks (DNN), convolutional deep neural networks (CNN), recurrent Boltzmann machine (RNN), restricted Boltzmann machine (RBM), deep belief networks (DBN), and deep Q-networks, and are applicable to fields including computer vision, voice recognition, natural language processing, and voice/signal processing, etc.

The main processor 110 performing the above-described functions may be a general purpose processor (e.g., CPU), but may be an AI processor (e.g., GPU) for AI learning.

Hence, the intelligent security device 100 may transmit the frame information to the smart device 14 over the 5G network and receive, from the smart device 14, a command that can be executed by the processor 110. This will be described in detail later.

Figure 6:
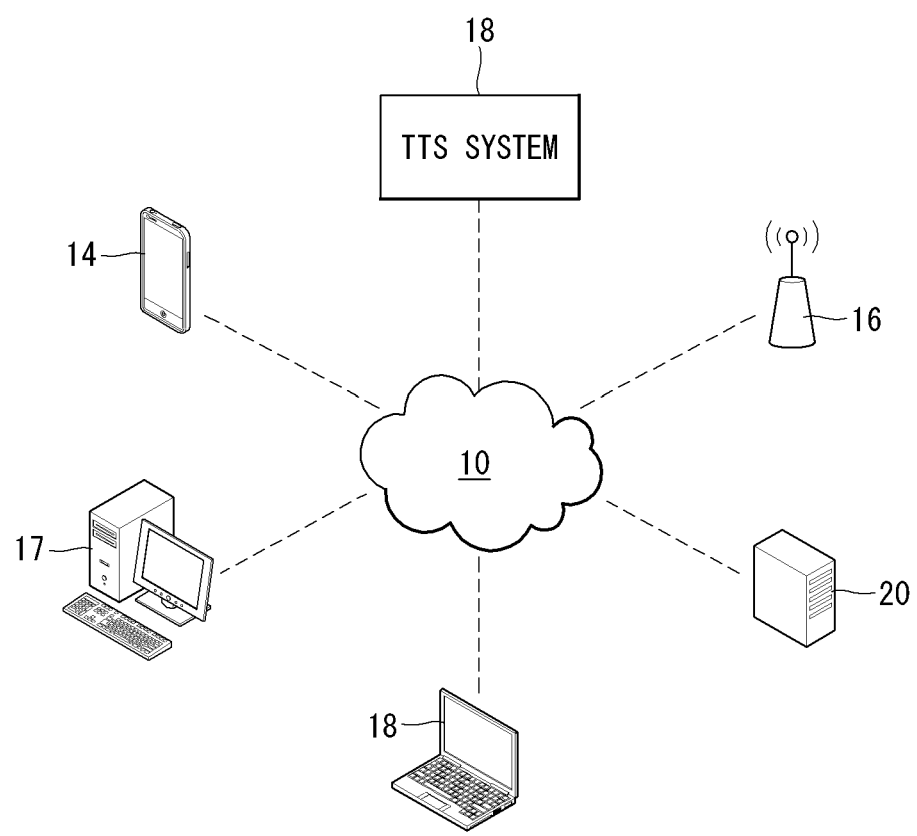
FIG. 6 shows an example of a schematic block diagram in which a text-to-speech (TTS) method according to an embodiment of the present disclosure is implemented.

FIG. 6 shows an example of a schematic block diagram in which a text-to-speech (TTS) method according to an embodiment of the present disclosure is implemented.

Referring to FIG. 6, a system in which a speech providing method is implemented according to an embodiment of the present disclosure may include as a speech providing apparatus, a network system 10, and a text-to-to-speech (TTS) system as a speech synthesis engine.

The at least one speech providing device may include a mobile phone 14, a PC 17, a notebook computer 18, and other server devices 20. The PC 17 and notebook computer 18 may connect to at least one network system 10 via a wireless access point 16. According to an embodiment of the present disclosure, the speech providing apparatus may include an audio book and a smart speaker.

Meanwhile, the TTS system 18 may be implemented in a server included in a network, or may be implemented by on-device processing and embedded in the speech providing device 10. In the exemplary embodiment of the present disclosure, it is assumed that the TTS system 18 is implemented in the speech providing device 10.

Figure 7:
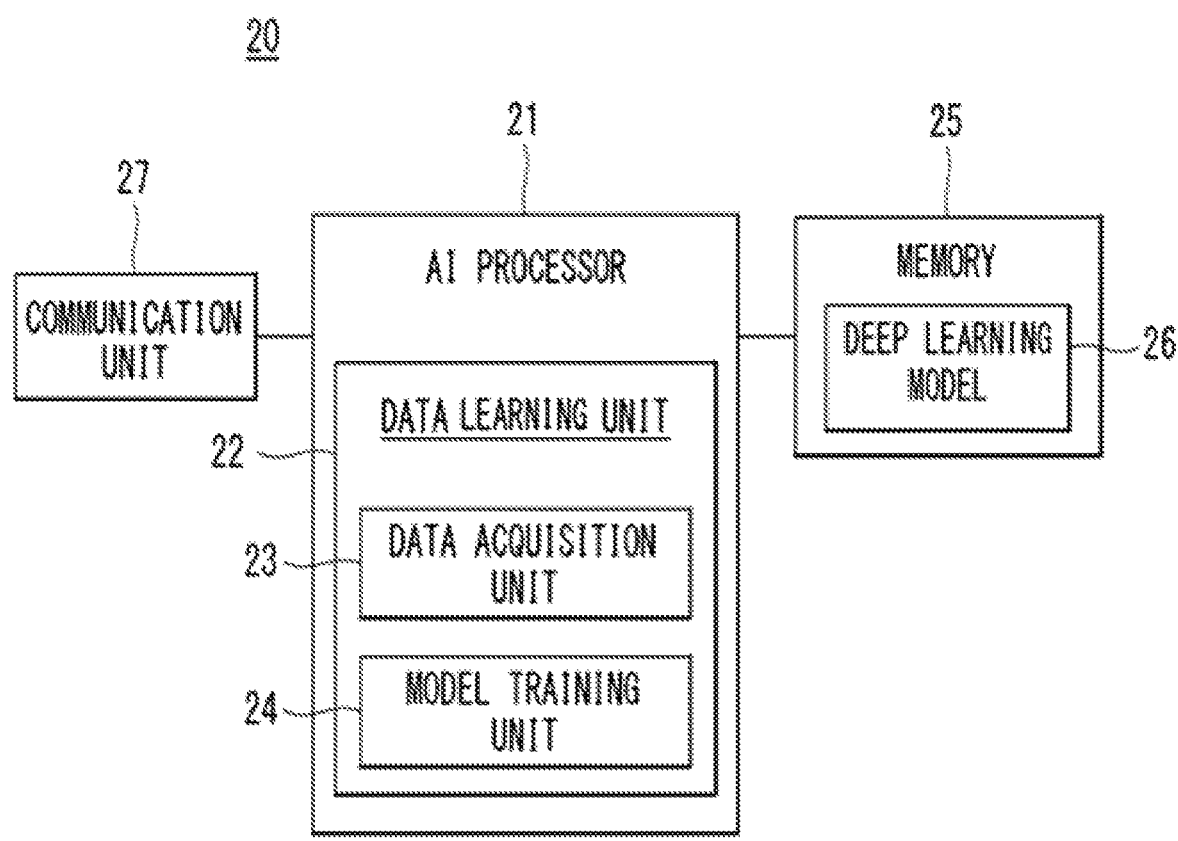
FIG. 7 is a block diagram illustrating an AI device according to an embodiment of the present disclosure.

FIG. 7 is a block diagram of an AI device according to an embodiment of the present disclosure.

The AI device 20 may include electronic equipment that includes an AI module to perform AI processing or a server that includes the AI module. Furthermore, the AI device 20 may be included in at least a portion of the intelligent security device 10, and may be provided to perform at least some of the AI processing.

The AI processing may include all operations related to the function of the intelligent security device 10. For example, the mobile terminal may AI-process sensing data or travel data to perform processing/determining and a control-signal generating operation. Furthermore, for example, the mobile terminal may AI-process data acquired through interaction with other electronic equipment provided in the mobile terminal to control sensing.

The AI device 20 may include an AI processor 21, a memory 25 and/or a communication unit 27.

The AI device 20 may be a computing device capable of learning a neural network, and may be implemented as various electronic devices such as a server, a desktop PC, a laptop PC or a tablet PC.

The AI processor 21 may learn the neural network using a program stored in the memory 25. Particularly, the AI processor 21 may learn the neural network for recognizing data related to the intelligent security device 10. Here, the neural network for recognizing data related to the intelligent security device 10 may be designed to simulate a human brain structure on the computer, and may include a plurality of network nodes having weights that simulate the neurons of the human neural network. The plurality of network nodes may exchange data according to the connecting relationship to simulate the synaptic action of neurons in which the neurons exchange signals through synapses. Here, the neural network may include the deep learning model developed from the neural network model. While the plurality of network nodes is located at different layers in the deep learning model, the nodes may exchange data according to the convolution connecting relationship. Examples of the neural network model include various deep learning techniques, such as a deep neural network (DNN), a convolution neural network (CNN), a recurrent neural network (RNN, Recurrent Boltzmann Machine), a restricted Boltzmann machine (RBM), a deep belief network (DBN) or a deep Q-Network, and may be applied to fields such as computer vision, voice recognition, natural language processing, voice/signal processing or the like.

Meanwhile, the processor performing the above-described function may be a general-purpose processor (e.g., CPU), but may be an AI dedicated processor (e.g., GPU) for artificial intelligence learning.

The memory 25 may store various programs and data required to operate the AI device 20. The memory 25 may be implemented as a non-volatile memory, a volatile memory, a flash memory), a hard disk drive (HDD) or a solid state drive (SDD). The memory 25 may be accessed by the AI processor 21, and reading/writing/correcting/deleting/update of data by the AI processor 21 may be performed.

Furthermore, the memory 25 may store the neural network model (e.g., the deep learning model 26) generated through a learning algorithm for classifying/recognizing data in accordance with the embodiment of the present disclosure.

The AI processor 21 may include a data learning unit 22 which learns the neural network for data classification/recognition. The data learning unit 22 may learn a criterion about what learning data is used to determine the data classification/recognition and about how to classify and recognize data using the learning data. The data learning unit 22 may learn the deep learning model by acquiring the learning data that is used for learning and applying the acquired learning data to the deep learning model.

The data learning unit 22 may be made in the form of at least one hardware chip and may be mounted on the AI device 20. For example, the data learning unit 22 may be made in the form of a dedicated hardware chip for the artificial intelligence AI, and may be made as a portion of the general-purpose processor (CPU) or the graphic dedicated processor (GPU) to be mounted on the AI device 20. Furthermore, the data learning unit 22 may be implemented as a software module. When the data learning unit is implemented as the software module (or a program module including instructions), the software module may be stored in a non-transitory computer readable medium. In this case, at least one software module may be provided by an operating system (OS) or an application.

The data learning unit 22 may include the learning-data acquisition unit 23 and the model learning unit 24.

The learning-data acquisition unit 23 may acquire the learning data needed for the neural network model for classifying and recognizing the data. For example, the learning-data acquisition unit 23 may acquire vehicle data and/or sample data which are to be inputted into the neural network model, as the learning data.

The model learning unit 24 may learn to have a determination criterion about how the neural network model classifies predetermined data, using the acquired learning data. The model learning unit 24 may learn the neural network model, through supervised learning using at least some of the learning data as the determination criterion. Alternatively, the model learning unit 24 may learn the neural network model through unsupervised learning that finds the determination criterion, by learning by itself using the learning data without supervision. Furthermore, the model learning unit 24 may learn the neural network model through reinforcement learning using feedback on whether the result of situation determination according to the learning is correct. Furthermore, the model learning unit 24 may learn the neural network model using the learning algorithm including error back-propagation or gradient descent.

If the neural network model is learned, the model learning unit 24 may store the learned neural network model in the memory. The model learning unit 24 may store the learned neural network model in the memory of the server connected to the AI device 20 with a wire or wireless network.

The data learning unit 22 may further include a learning-data preprocessing unit and a learning-data selection unit to improve the analysis result of the recognition model or to save resources or time required for generating the recognition model.

The learning-data preprocessing unit may preprocess the acquired data so that the acquired data may be used for learning for situation determination. For example, the learning-data preprocessing unit may process the acquired data in a preset format so that the model learning unit 24 may use the acquired learning data for learning for image recognition.

Furthermore, the learning-data selection unit may select the data required for learning among the learning data acquired by the learning-data acquisition unit 23 or the learning data preprocessed in the preprocessing unit. The selected learning data may be provided to the model learning unit 24. For example, the learning-data selection unit may select only data on the object included in a specific region as the learning data, by detecting the specific region in the image acquired by the camera of the intelligent security device 10.

Furthermore, the data learning unit 22 may further include a model evaluation unit to improve the analysis result of the neural network model.

When the model evaluation unit inputs evaluated data into the neural network model and the analysis result outputted from the evaluated data does not satisfy a predetermined criterion, the model learning unit 22 may learn again. In this case, the evaluated data may be predefined data for evaluating the recognition model. By way of example, the model evaluation unit may evaluate that the predetermined criterion is not satisfied when the number or ratio of the evaluated data in which the analysis result is inaccurate among the analysis result of the learned recognition model for the evaluated data exceeds a preset threshold.

The communication unit 27 may transmit the AI processing result by the AI processor 21 to the external electronic equipment.

Here, the external electronic equipment may be defined as the intelligent security device 10. Furthermore, the AI device 20 may be defined as another intelligent security device 10 or a 5G network that communicates with the intelligent security device 10. Meanwhile, the AI device 20 may be implemented by being functionally embedded in an autonomous driving module provided in the intelligent security device 10. Furthermore, the 5G network may include a server or a module that performs related control of the intelligent security device 10.

Although the AI device 20 illustrated in FIG. 7 is functionally divided into the AI processor 21, the memory 25, the communication unit 27 and the like, it is to be noted that the above-described components are integrated into one module, which is referred to as an AI module.

Figure 8:
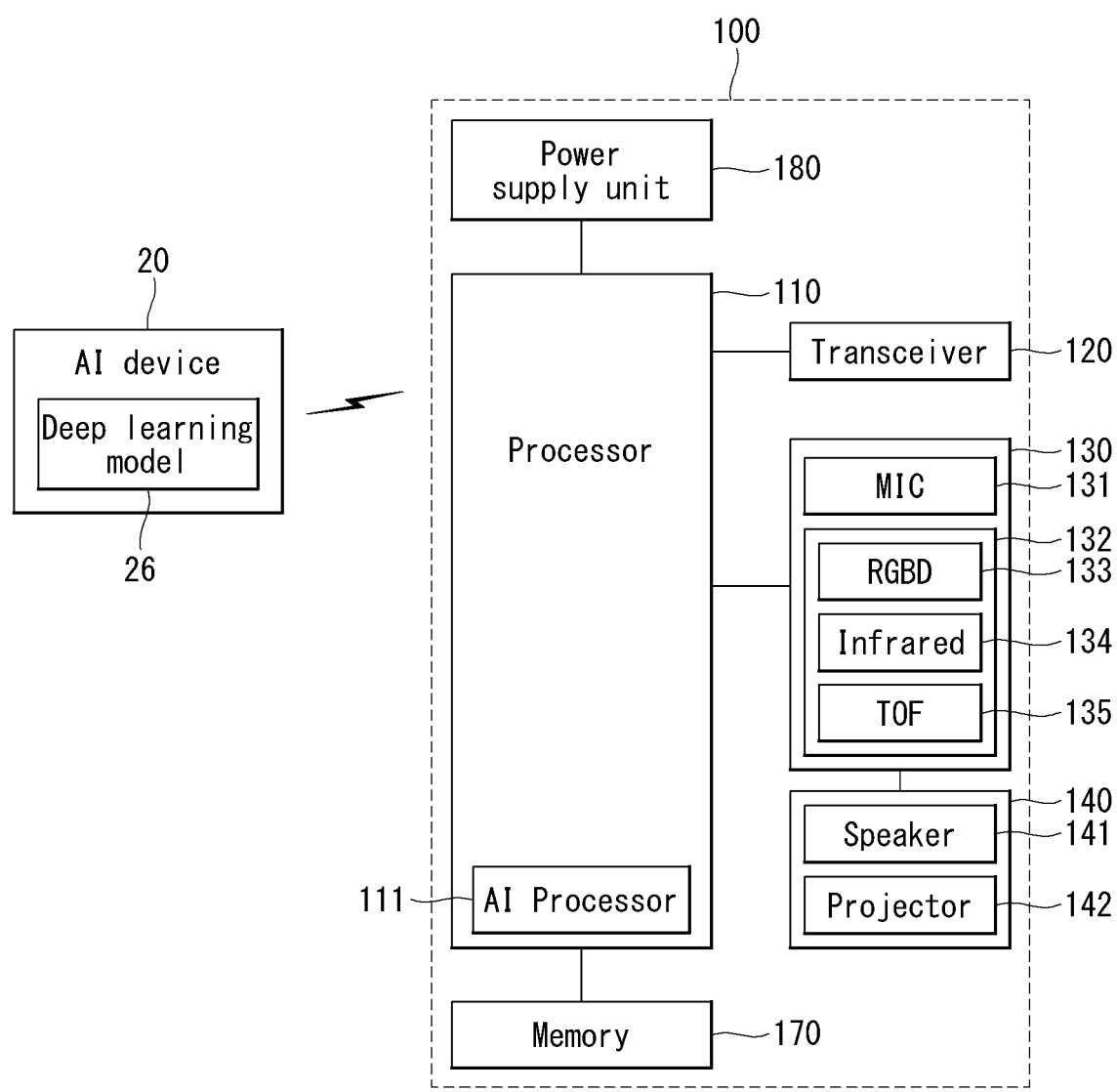
FIG. 8 is an example block diagram of an intelligent security device according to an embodiment of the present disclosure.

FIG. 8 is an example block diagram of an intelligent security device according to an embodiment of the present disclosure.

An intelligent security device (e.g., TTS device) 100 illustrated in FIG. 8 may include an output unit 140 for outputting a voice processed by the intelligent security device 100 or another device. The output unit 140 may be called a speaker 141.

More specifically, FIG. 8 illustrates the intelligent security device (e.g., TTS device) 100 for performing voice recognition. An embodiment of the present disclosure may include computer-readable and computer-executable instructions that may be included in the intelligent security device. FIG. 8 illustrates a plurality of components included in the intelligent security device, but it is obvious that components which are not illustrated in FIG. 8 may be included in the intelligent security device.

Several components included in the intelligent security device 100 may be a single component which may repeat itself in one device several times. For example, the intelligent security device 100 may include a transceiver 120, an input unit 130, an output unit 140, a memory 170, a power supply unit 180, a motor 153, a sensor 160, a projector 142, and/or a processor 110.

A plurality of intelligent security devices may be applied to a single intelligent security device. In such a multi-device system, the intelligent security device 100 may include different components for performing various aspects of voice recognition and processing. The intelligent security device 100 illustrated in FIG. 8 may be, for example, an independent device, or may be implemented as one component of a larger device or system.

An embodiment of the present disclosure may be applied to a plurality of different devices and computer systems, for example, a general purpose computing system, a server-client computing system, a telephone computing system, a laptop computer, a mobile terminal, a PDA, and a tablet computer. The intelligent security device 100 may also be applied as one component of other devices or systems that provide a voice recognition function, for example, automated teller machines (ATMs), kiosks, global positioning systems (GPSs), home appliances (e.g., refrigerators, ovens, washing machines, etc.), vehicles, and ebook readers.

Referring to FIG. 8, the intelligent security device 100 may include the speaker 141 for outputting a voice processed by the intelligent security device 100 or another device.

The speaker 141 may include a headphone or other appropriate component that propagates sound. The speaker 141 may be called the output unit 140. The speaker 141 may be integrated with the intelligent security device 100, or may be implemented separately from the intelligent security device 100.

The intelligent security device 100 may include an address/data bus for transmitting data among the components of the intelligent security device 100. Each of the components in the intelligent security device 100 may be directly connected to other components via the bus. Each of the components in the intelligent security device 100 may be directly connected to the processor 110.

The intelligent security device 100 may include the processor 110. The processor 110 may correspond to a CPU for processing data, computer-readable instructions processing data, and the memory 170 for storing data and instructions.

The memory 170 may include a volatile RAM, a non-volatile ROM, or other types of memory.

The intelligent security device 100 may include the memory 170 for storing data and instructions. The memory 170 may include a magnetic storage, an optical storage, a solid-state storage, etc.

The intelligent security device 100 may be connected to a removable or external memory 170 (e.g., removable memory card, memory key drive, network storage, etc.) through the input unit 130 or the output unit 140.

Computer instructions to be processed by the processor 110 for operating the intelligent security device 100 and its various components may be executed by the processor 110 and stored in the memory 170, an external device or a memory 170 or a storage included in the processor 110 to be described later. Alternatively, all or some of the executable instructions may be added to software and embedded in hardware or firmware. An embodiment of the present disclosure may be implemented by, for example, various combinations of software, firmware, and/or hardware.

The input unit 130 may include a microphone, a touch input unit 130, a keyboard, a mouse, a stylus, a camera 132, or other input unit 130. The camera 132 will be described later.

The output unit 140 may include an audio output unit. The output unit 140 may include a display (visual display or tactile display), an audio speaker, a headphone, a printer, or other output units. The input unit 130 and/or the output unit 140 may include an interface for connecting external peripherals, such as a universal serial bus (USB), FireWire, Thunderbolt, or other connection protocols. The input unit 130 and/or the output unit 130 may further include a network connection such as Ethernet port and modem. The intelligent security device 100 may include a wireless communication device, such as a radio frequency (RF), infrared, BLUETOOTH, and a wireless local area network (WLAN) (e.g., Wi-Fi), or a wireless network device, such as a 5G network, a long term evolution (LTE) network, a WiMAN network, and a 3G network. The intelligent security device 100 may include the internet or a distributed computing environment through the input unit 120 and/or the output unit 130.

The intelligent security device 100 may transmit a learning video or frame information to the smart device through the transceiver 120 and receive, from the smart device, a command that can be executed by the processor 110. The transceiver 120 may exchange signals with the server or the smart device located outside the intelligent security device 100. The server may be called a cloud.

For example, the transceiver 120 may exchange signals with at least one of an infrastructure (e.g., cloud), other intelligent security device, or the smart device. The transceiver 120 may include at least one of a transmission antenna, a reception antenna, a radio frequency (RF) circuit capable of implementing various communication protocols, and a RF element, in order to perform communication.

The motor 153 may control the camera 132 under the control of the processor 110. The motor 153 may be physically connected to the camera 132 and drive the camera 132 so that the camera 132 moves in various directions. The motor 153 may operate to rotate 360 degrees under the control of the processor 110. The motor 153 may include a servo motor. The servo motor may be an electric motor that is used to convert a voltage input in an automatic control structure or an automatic balancing instrument into a mechanical motion and adjust a rotation angle. Examples of the servo motor may include a 2-phase AC servo motor and a DC servo motor. In particular, a small-sized servo motor may be called a micromotor. The servo motor may include an encoder and a feedback device that can accurately count the number of rotations. The servo motor may perform an accurate location control by operating the encoder and the feedback device under the control of the processor 110.

The sensor 160 may include at least one of a motion sensor, an ultrasonic sensor, and an infrared sensor. The sensor 160 may provide the smart device with data for a motion generated based on a sensing signal, that is generated by a motion generated in an area captured by the camera 132, through the processor 110 or the transceiver 120. For example, if a sensing signal is transmitted from the sensor 160 sensing a specific area or a corresponding area, the processor 110 may control the motor 153 and control the direction of the intelligent security device 100 or the camera 132 so that the camera 132 captures the specific area or the corresponding area.

The projector 142 may be mounted on the intelligent security device 100 and receive a command provided by the smart device or the cloud through the transceiver 120 to project or display a location video corresponding to the command on a partial area. The projector 142 may receive data related to the location video from the smart device or the cloud and project or display the location video, that is enlarged through a lens, on a partial area. The projector 142 may project or display the location video in various ways. Examples of the projector 142 may include a CRT projector that combines and displays light coming from three CRTs (green, red and blue) in a CRT manner like TVs, a LCD projector that displays combined pixels of three colors on the screen in a liquid crystal manner, and a DLP projector that uses a digital light processing technology.

The camera 132 may be mounted on the intelligent security device 100 and may capture a predetermined area or a specific area. The predetermined area or the specific area may be captured by the plurality of cameras 132. The camera 132 may include a RGBD (Red, Green, Blue, Distance) camera 133, an infrared camera 134, and a time-of-flight (ToF) camera 135.

The RGBD camera 133 may detect a motion in the predetermined area or the specific area using captured images having depth data obtained from a camera having RGBD sensors or other similar 3D imaging devices.

The infrared camera 134 may be a charge coupled device (CCD) camera with a sufficient intensity for infrared light. For example, if the infrared camera 134 captures a pedestrian in a predetermined area or a specific area at night, the infrared camera 134 may relatively accurately recognize the pedestrian in the predetermined area or the specific area by attaching an infrared filter to the lighting with high light collection. For example, if the infrared camera 134 captures wildlife at night, the infrared camera 134 does not destroy the natural ecosystem by attaching an infrared filter to the lighting with high light collection, and thus may be very effective.

The ToF camera 135 may use a method of calculating a distance based on a time difference between the emission of light and its return after being reflected. That is, the ToF camera 135 may be a camera that outputs a distance image using a ToF method.

As described above, the camera 132 may include cameras with different manners. The processor 110 may acquire motion information in a video taken with at least one camera 132 embedded in the intelligent security device 100. The motion information may be information or data about behavior of a pedestrian moving in a predetermined area or a specific area.

The intelligent security device 100 may include the processor 110 for processing an audio waveform including text data and voice.

The processor 110 may be connected to a bus, the input unit 130, the output unit 140, and/or other components of the intelligent security device 100.

Sources of text data may be produced by an internal component of the intelligent security device 100. The sources of the text data may be received from the input unit 130 such as a keyboard, or may be transmitted to the intelligent security device 100 through a network connection. Text may take the form of a sentence including text, number, and/or punctuation that are converted into speech by the processor 110. The input text may include a special annotation for processing by the processor 110, and the special annotation may indicate how specific text is to be pronounced. The text data may be processed in real time or may be stored and processed at a later time.

Also, the processor 110 may include a front end, a speech synthesis engine, and a TTS storage. The front end may convert input text data into a symbolic linguistic representation for processing by the speech synthesis engine. The speech synthesis engine may convert the input text into speech by comparing annotated phonetic unit models with information stored in the TTS storage. The front end and the speech synthesis engine may include an internal embedded processor or a memory, or may use the processor 110 and the memory 170 included in the intelligent security device 100. Instructions for running the front end and the speech synthesis engine may be included in the processor 110, the memory 170 of the intelligent security device 100, or an external device.

The text input of the processor 110 may be transmitted to the front end for processing. The front end may include a module for performing text normalization, linguistic analysis, and linguistic prosody generation.

During the text normalization, the front end processes the text input, generates standard text, and converts numbers, abbreviations, and symbols into the equivalent of written-out words.

During the linguistic analysis, the front end may generate a sequence of phonetic units corresponding to the input text by analyzing the language in the normalized text. This process may be called phonetic transcription. Phonetic units include symbolic representations of sound units that are eventually combined and are output by the intelligent security device 100 as speech. Various sound units may be used to divide text for the purpose of speech synthesis. The processor 110 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. The mapping may be performed using a language dictionary stored in the intelligent security device 100.

The linguistic analysis performed by the front end may include a process of identifying different grammatical components such as prefixes, suffixes, phrases, punctuation, and syntactic boundaries. These grammatical components may be used to make a natural audio waveform output by the processor 110. The language dictionary may also include letter-to-sound rules and other tools that may be used to pronounce previously unidentified words or letter combinations that may be generated by the processor 110. Generally, as an amount of information included in the language dictionary increases, the speech output with high quality can be secured.

Based on the linguistic analysis, the front end may perform linguistic prosody generation where the phonetic units are annotated with prosodic characteristics which indicate how the phonetic units are to be pronounced in the eventual output speech.

The prosodic characteristics may also be called acoustic features. During this stage, the front end may combine to the processor 170 considering any prosodic annotations accompanying the text input. These acoustic features may include a pitch, energy, a duration, and the like. Application of the acoustic features may be based on prosodic models available to the processor 170. These prosodic models may indicate how phonetic units are to be pronounced in certain circumstances. For example, a prosodic model may consider a phoneme's position in a syllable, a syllable's position in a word, a word's position in a sentence or phrase, neighboring phonetic units, etc. In the same manner as the language dictionary, as an amount of information on the prosodic model increases, the speech output with high quality can be secured.

The output of the front end may include a sequence of phonetic units annotated with prosodic characteristics. The output of the front end may be called a symbolic linguistic representation. This symbolic linguistic representation may be sent to the speech synthesis engine. The speech synthesis engine may perform a process of converting speech into an audio waveform to output it to a user through the audio output unit 140. The speech synthesis engine may be configured to convert the input text into high-quality natural speech in an efficient manner. The high quality speech may be configured to pronounce as much like a human speaker as possible.

The speech synthesis engine may perform speech synthesis using one or more different methods.

A unit selection engine contrasts a recorded speech database with the symbolic linguistic representation created by the front end. The unit selection engine matches the symbolic linguistic representation to speech audio units of the speech database. Matching units are selected and concatenated together to form a speech output. Each unit may include an audio waveform corresponding to a phonetic unit, such as a short .wav file of a specific sound, together with a description of the various acoustic features associated with .wav file (e.g., pitch, energy, etc.), as well as other information, such as where the phonetic units are represented in words, sentences, phrases, or neighboring phonetic units, etc.

The unit selection engine may match units to the input text using all of information in the unit database to create a natural speech waveform. The unit database may include examples of phonetic units to provide the intelligent security device 100 with different options for concatenating units into speech. One advantage of unit selection is that a natural speech output can be generated according to the size of the database. Moreover, as the size of the unit database increases, the intelligent security device 100 can construct the natural speech.

Another method of speech synthesis other than the above-described unit selection synthesis includes a parametric synthesis method. In the parametric synthesis, synthesis parameters such as frequency, volume, and noise may be varied by a parametric synthesis engine, a digital signal processor, or other audio generation device to create an artificial speech waveform output.

The parametric synthesis may match a symbolic linguistic representation to desired output speech parameters using an acoustic model and various statistical techniques. The parametric synthesis can process the speech without a large volume database associated with the unit selection and also perform the accurate processing of the speech at high speed. The unit selection synthesis method and the parametric synthesis method may be performed individually or combined together to produce a speech audio output.

Parametric speech synthesis may be performed as follows. The processor 110 may include an acoustic model which can convert a symbolic linguistic representation into a synthetic acoustic waveform of text input based on audio signal manipulation. The acoustic model may include a rule which may be used by the parametric synthesis engine to assign specific audio waveform parameters to input phonetic units and/or prosodic annotations. The rule may be used to calculate a score indicating a likelihood that a specific audio output parameter (e.g., frequency, volume, etc.) corresponds to a part of the input symbolic linguistic representation from the front end.

The parametric synthesis engine may employ a plurality of techniques to match speech to be synthesized to the input phonetic units and/or the prosodic annotations. One common technique uses a hidden Markov model (HMM). The HMM may be used to determine a probability that the audio output should match with the text input. The HMM may be used to convert parameters of linguistic and acoustic space into parameters to be used by a vocoder (a digital voice encoder), in order to artificially synthesize the desired speech.

The intelligent security device 100 may include a phonetic unit database for use in unit selection.

The phonetic unit database may be stored in the memory 170 or other storage component. The phonetic unit database may include recorded speech utterances. The speech utterances may be a text corresponding to the utterances. The phonetic unit database may include a recorded speech (in the form of audio waveform, feature vector, or other format) which occupies a significant amount of storage in the intelligent security device 100. Unit samples in the phonetic unit database may be classified in a variety of ways including phonetic unit (phoneme, diphone, word, etc.), linguistic prosodic label, acoustic feature sequence, speaker identity, etc. A sample utterance may be used to create a mathematical model corresponding to a desired audio output for a specific phonetic unit.

When matching a symbolic linguistic representation, the speech synthesis engine may select a unit in the phonetic unit database that most closely matches to the input text (including both phonetic units and prosodic symbol annotations). Generally, as the size of the phonetic unit database increases, the number of unit samples that can be selected increases, thereby enabling the accurate speech output.

The processor 110 may send audio waveforms including the speech output to the output unit 140 and output the audio waveforms to the user. The audio waveforms including the speech may be stored in a plurality of different formats such as a series of feature vectors, uncompressed audio data, or compressed audio data. For example, the speech output may be encoded and/or compressed by an encoder/decoder before the transmission. The encoder/decoder may encode and decode audio data such as digitized audio data and feature vectors. It is obvious that the function of the encoder/decoder can be located in a separate component or can be executed by the processor 110.

The memory 170 may store other information for speech recognition.

The content of the memory 170 may be prepared for the general use of TTS and may be customized to include sounds and words that are likely to be used in a specific application. For example, a TTS storage may include a customized speech specialized for positioning and navigation for the purpose of TTS processing by a global positioning system (GPS) device.

For example, the memory 170 may be customized for a user based on an individualized desired speech output. For example, the user may prefer an output voice to be a specific gender, have a specific accent, be spoken at a specific speed, or have a specific emotion (e.g., a happy voice). The speech synthesis engine may include a specialized database or model to account for such a user preference.

The intelligent security device 100 may also be configured to perform TTS processing in multiple languages. For each language, the processor 110 may include specially configured data, instructions, and/or components to synthesize speech in a desired language.

To improve performance, the processor 110 may revise/update the content of the memory 170 based on feedback about a result of TTS processing, thus enabling the processor 110 to improve the voice recognition beyond a capability provided in a training corpus.

As the processing capability of the intelligent security device 100 has been improved, the speech output can be produced by reflecting emotional attributes of input text. Alternatively, even if the input text does not contain emotional attributes, the intelligent security device 100 can perform the speech output by reflecting an intention (e.g., emotional information) of the user who writes the input text.

When constructing a model to be integrated with a TTS module that actually performs TTS processing, a TTS system may integrate the aforementioned various components and other components. As an example, the intelligent security device 100 may include a block for setting a speaker.

Also, a speaker setting unit may set a speaker for each character that appears in a script. The speaker setting unit may be integrated with the processor 110 or integrated as part of the front end or the speech synthesis engine. The speaker setting unit allows text corresponding to a plurality of characters to be synthesized in a set speaker's voice by using metadata corresponding to a speaker profile.

According to an embodiment of the present disclosure, the metadata may use a markup language, preferably, a speech synthesis markup language (SSML).

A speech processing process performed in a device environment and/or a cloud environment (or server environment) will be described below with reference to FIGS. 9 and 10.

Figure 9:
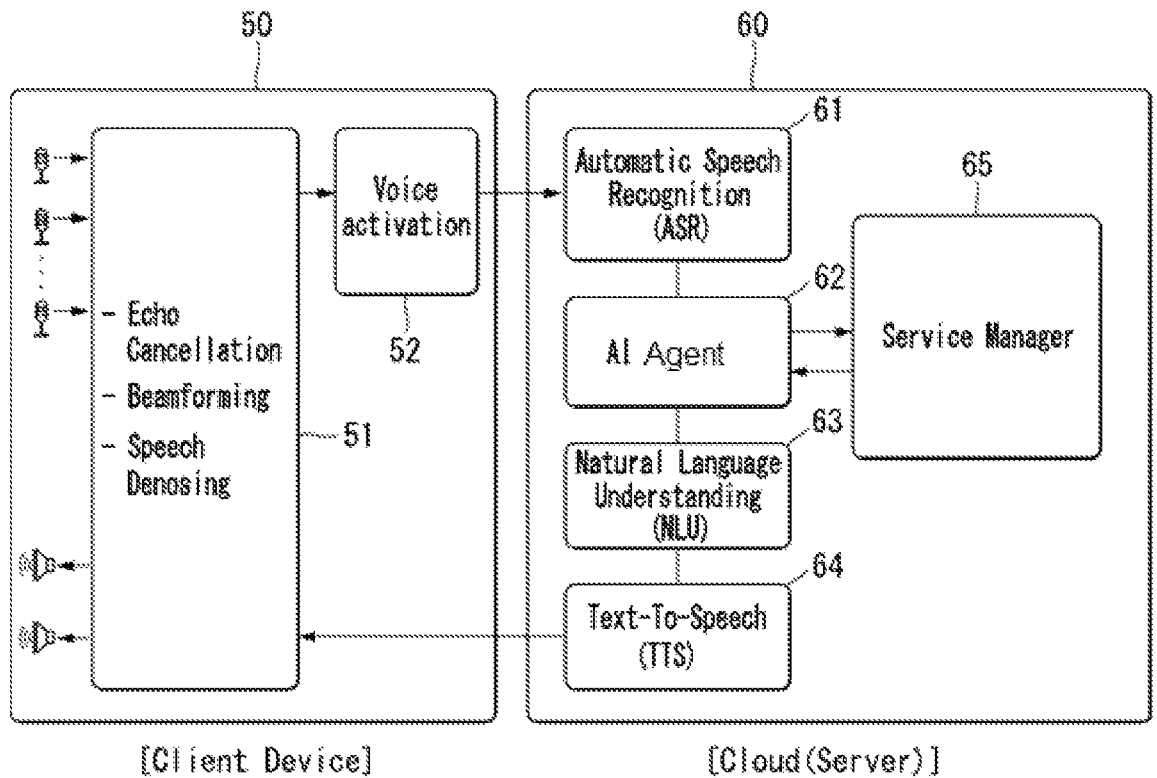
FIG. 9 shows a schematic block diagram of a text-to-speech (TTS) device in a TTS system according to an embodiment of the present disclosure.

FIG. 9 shows an example in which, while a speech can be received in a device 50, a procedure of processing the received speech and thereby synthesize the speech, that is, overall operations of speech synthesis, is performed in a cloud environment 60. On the contrary, FIG. 10 shows an example of on-device processing indicating that a device 70 performs the aforementioned overall operations of speech synthesis by processing a received speech and thereby synthesizing the speech.

Figure 10:
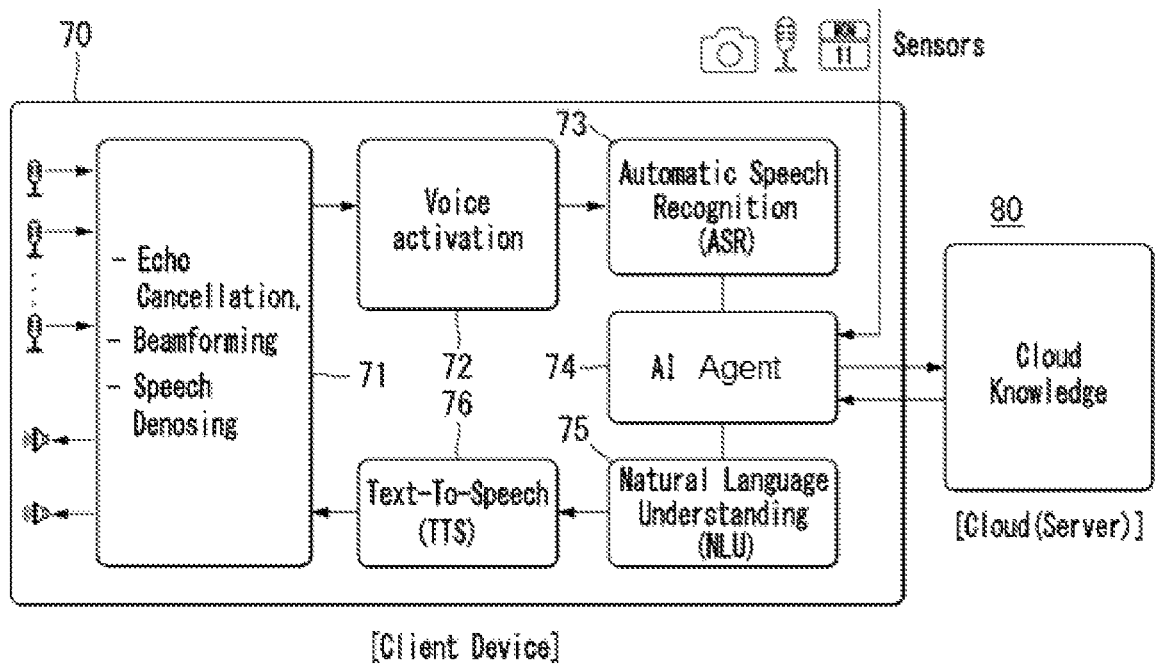
FIG. 10 is a schematic block diagram of a TTS device in a TTS system environment according to an embodiment of the present disclosure.

In FIGS. 9 and 10, the device environments 50 and 70 may be referred to as client devices, and the cloud environments 60 and 80 may be referred to as servers.

FIG. 9 shows a schematic block diagram of a text-to-speech (TTS) device in a TTS system according to an embodiment of the present disclosure.

In order to process a speech event in an end-to-end speech UI environment, various configurations are required. A sequence for processing the speech event performs signal acquisition playback, speech pre-processing, voice activation, speech recognition, natural language processing, and speech synthesis by which a device responds to a user.

The client device 50 may include an input module. The input module may receive a user input from a user. For example, the input module may receive the user input from an external device (e.g., a keyboard and a headset) connected thereto. In addition, for example, the input module may include a touch screen. In addition, for example, the input module may include a hardware key located in a user terminal.

According to an embodiment, the input module may include at least one microphone capable of receiving a user's utterance as a speech signal. The input module may include a speech input system and receive a user's speech as a speech signal through the speech input system. By generating an input signal for an audio input, the at least one microphone may determine a digital input signal for a user's speech. According to an embodiment, multiple microphones may be implemented as an array. The array may be arranged in a geometric pattern, for example, a linear geometric shape, a circular geometric shape, or a different random shape. For example, the array may be in a pattern in which four sensors are placed at 90 degrees to receive sound from four directions. In some embodiments, the microphone may include sensors of different arrays in a space of data communication, and may include a networked array of the sensors. The microphone may include an omnidirectional microphone and a directional microphone (e.g., a shotgun microphone).

The client device 50 may include a pre-processing module 51 capable of pre-processing a user input (speech signal) that is received through the input module (e.g., a microphone).

The pre-processing module 51 may include an adaptive echo canceller (AEC) function to thereby remove echo included in a user speech signal received through the microphone. The pre-processing module 51 may include a noise suppression (NS) function to thereby remove background noise included in a user input. The pre-processing module 51 may include an end-point detect (EPD) function to thereby detect an end point of a user speech and thus find out where the user speech exists. In addition, the pre-processing module 51 may include an automatic gain control (AGC) function to thereby control volume of the user speech in such a way suitable for recognizing and processing the user speech.

The client device 50 may include a voice activation module 52. The voice activation module 52 may recognize a wake-up call indicative of recognition of a user's call. The voice activation module 52 may detect a predetermined keyword (e.g., Hi LG) from a user input which has been pre-processed. The voice activation module 52 may remain in a standby state to perform an always-on keyword detection function.

The client device 50 may transmit a user voice input to a cloud server. ASR and natural language understanding (NLU) operations, which are useful to process a user speech, is generally performed in Cloud due to computing, storage, power limitations, and the like. The Cloud may include the cloud device 60 that processes a user input transmitted from a client. The cloud device 60 may exist as a server.

The cloud device 60 may include an auto speech recognition (ASR) module 61, an artificial intelligent agent 62, a natural language understanding (NLU) module 63, a text-to-speech (TTS) module 64, and a service manager 65.

The ASR module 61 may convert a user input, received from the client device 50, into textual data.

The ASR module 61 includes a front-end speech pre-processor. The front-end speech pre-processor extracts a representative feature from a speech input. For example, the front-perform a Fourier transform on the speech input to extract spectral features that characterize the speech input as a sequence of representative multi-dimensional vectors. In addition, The ASR module 61 may include one or more speech recognition modules (e.g., an acoustic model and/or a language module) and may realize one or more speech recognition engines. Examples of the speech recognition model include Hidden Markov Models, Gaussian-Mixture Models, Deep Neural Network Models, n-gram language models, and other statistical models. Examples of the speech recognition model include a dynamic time warping (DTW)-based engine and a weighted finite state transducer (WFST)-based engine. The one or more speech recognition models and the one or more speech recognition engines can be used to process the extracted representative features of the front-end speech pre-processor to produce intermediate recognitions results (e.g., phonemes, phonemic strings, and sub-words), and ultimately, text recognition results (e.g., words, word strings, or sequence of tokens).

Once the ASR module 61 generates a recognition result including a text string (e.g., words, or sequence of words, or sequence of tokens), the recognition result is transmitted to the NLP module 732 for intention deduction. In some examples, The ASR module 730 generates multiple candidate text expressions for a speech input. Each candidate text expression is a sequence of works or tokens corresponding to the speech input.

The NLU module 63 may perform a syntactic analysis or a semantic analysis to determine intent of a user. The syntactic analysis may be used to divide a user input into syntactic units (e.g., words, phrases, morphemes, or the like) and determine whether each divided unit has any syntactic element. The semantic analysis may be performed using semantic matching, rule matching, formula matching, or the like. Thus, the NLU module 63 may obtain a domain, intent, or a parameter (or a slot) necessary to express the intent from a user input through the above-mentioned analysis.

According to an embodiment, the NLU module 63 may determine the intent of the user and a parameter using a matching rule which is divided into a domain, intent, and a parameter. For example, one domain (e.g., an alarm) may include a plurality of intents (e.g., alarm setting, alarm release, and the like), and one intent may need a plurality of parameters (e.g., a time, the number of iterations, an alarm sound, and the like). The plurality of rules may include, for example, one or more mandatory parameters. The matching rule may be stored in a natural language understanding database.

According to an embodiment, the NLU module 63 may determine a meaning of a word extracted from a user input using a linguistic feature (e.g., a syntactic element) such as a morpheme or a phrase and may match the determined meaning of the word to the domain and intent to determine the intent of the user. For example, the NLU module 63 may determine the intent of the user by calculating how many words extracted from a user input are included in each of the domain and the intent. According to an embodiment, the NLU module 63 may determine a parameter of the user input using a word which is the basis for determining the intent. According to an embodiment, the NLU module 63 may determine the intent of the user using a NLU DB which stores the linguistic feature for determining the intent of the user input. According to another embodiment, the NLU module 63 may determine the intent of the user using a personal language model (PLM). For example, the NLU module 63 may determine the intent of the user using personalized information (e.g., a contact list, a music list, schedule information, social network information, etc.). For example, the PLM may be stored in, for example, the NLU DB. According to an embodiment, the ASR module 61 as well as the NLU module 63 may recognize a voice of the user with reference to the PLM stored in the NLU DB.

According to an embodiment, the NLU module 63 may further include a natural language generating module. The natural language generating module may change specified information to a text form. The information changed to the text form may be a natural language speech. For example, the specified information may be information about an additional input, information for guiding the completion of an action corresponding to the user input, or information for guiding the additional input of the user. The information changed to the text form may be displayed in a display after being transmitted to the client device or may be changed to a voice form after being transmitted to the TTS module.

The TTS module 64 may convert text input to voice output. The TTS module 64 may receive text input from the NLU module 63 of the LNU module 63, may change the text input to information in a voice form, and may transmit the information in the voice form to the client device 50. The client device 50 may output the information in the voice form via the speaker.

The speech synthesis module 64 synthesizes speech outputs based on a provided text. For example, a result generated by the ASR module 61 may be in the form of a text string. The speech synthesis module 64 may convert the text string to an audible speech output. The speech synthesis module 64 may use any appropriate speech synthesis technique in order to generate speech outputs from text, including, but not limited to, concatenative synthesis, unit selection synthesis, diphone synthesis, domain-specific synthesis, formant synthesis, articulatory synthesis, hidden Markov model (HMM) based synthesis, and sinewave synthesis.

In some examples, the speech synthesis module 64 may be configured to synthesize individual words based on phonemic strings corresponding to the words. For example, a phonemic string can be associated with a word in a generated text string. The phonemic string can be stored in metadata associated with the word. The speech synthesis model 64 may be configured to directly process the phonemic string in the metadata to synthesize the word in speech form.

Since the cloud environment generally has more processing capabilities or resources than the client device, a higher quality speech output may be acquired in synthesis on the client side. However, the present disclosure is not limited thereto, and the speech synthesis process may be performed on the client side (see FIG. 10).

Meanwhile, according to an embodiment, the client environment may further include an Artificial Intelligence (AI) agent 62. The AI agent 62 is defined to perform at least some of the above-described functions performed by the ASR module 61, the NLU module 62 and/or the TTS module 64. In addition, the AI module 62 may make contribution so that the ASR module 61, the NLU module 62 and/or the TTS module 64 perform independent functions, respectively.

The AI agent module 62 may perform the above-described functions through deep learning. The deep learning represents a certain data in a form readable by a computer (e.g., when the data is an image, pixel information is represented as column vectors or the like), and efforts are being made to conduct enormous researches for applying the representation to learning (which is about how to create better representation techniques and how to create a model that learns the better representation techniques), and, as a result, various deep learning techniques such as deep neural networks (DNN), convolutional deep neural networks (CNN), Recurrent Boltzmann Machine (RNN), Restricted Boltzmann Machine (RBM), deep belief networks (DBN), and Deep Q-Network, may be applied to computer vision, speech recognition, natural language processing, speech/signal processing, and the like.

Currently, all commercial speech recognition systems (Microsoft's Cortana, Skype translator, Google Now, Apple Siri, etc.). are based on deep learning techniques.

In particular, the AI agent module 62 may perform various natural language processes, including machine translation, emotion analysis, and information retrieval, to process natural language by use of a deep artificial neural network architecture.

Meanwhile, the cloud environment may include a service manager 65 capable of collecting various personalized information and supporting a function of the AI agent 62. The personalized information acquired through the service manager may include at least one data (a calendar application, a messaging service, usage of a music application, etc.) used through the cloud environment, at least one sensing data (a camera, a microphone, temperature, humidity, a gyro sensor, C-V2X, a pulse, ambient light, Iris scan, etc.) collected by the client device 50 and/or the cloud 60, off device data directly not related to the client device 50. For example, the personalized information may include maps, SMS, news, music, stock, weather, Wikipedia information.

For convenience of explanation, the AI agent 62 is represented as an additional block to be distinguishable from the ASR module 61, the NLU module 63, and the TTS module 64, but the AI agent 62 may perform at least some or all of the functions of the respective modules 61, 62, and 64.

In FIG. 9, an example in which the AI agent 62 is implemented in the cloud environment due to computing calculation, storage, power limitations, and the like, but the present disclosure is not limited thereto.

For example, FIG. 10 is identical to what is shown in FIG. 9, except for a case where the AI agent is included in the cloud device.

FIG. 10 is a schematic block diagram of a TTS device in a TTS system environment according to an embodiment of the present disclosure.

A client device 70 and a cloud environment 80 shown in FIG. 10 may correspond to the client device 50 and the cloud device 60 aforementioned in FIG. 9, except for some configurations and functions. Accordingly, description about specific functions of corresponding blocks may refer to FIG. 9.

Referring to FIG. 10, the client device 70 may include a pre-processing module 71, a voice activation module 72, an ASR module 73, an AI agent 74, an NLU module 75, and a TTS module 76. In addition, the client device 70 may include an input module (at least one microphone) and at least one output module.

In addition, the cloud environment may include cloud knowledge 80 that stores personalized information in a knowledge form.

A function of each module shown in FIG. 10 may refer to FIG. 9. However, since the ASR module 73, the NLU module 75, and the TTS module 76 are included in the client device 70, communication with Cloud may not be necessary for a speech processing procedure such as speech recognition, speech synthesis, and the like, and thus, an instant real-time speech processing operation is possible.

Each module shown in FIGS. 9 and 10 are merely an example for explaining a speech processing procedure, and modules more or less than in FIGS. 9 and 10 may be included. In addition, two or more modules may be combined or different modules or modules with different arrangement structures may be included. The various modules shown in FIGS. 9 and 10 may be implemented in hardware, software instructions for execution by one or more processors, firmware, including one or more signal processing and/or application specific integrated circuits, or a combination thereof.

Figure 11:
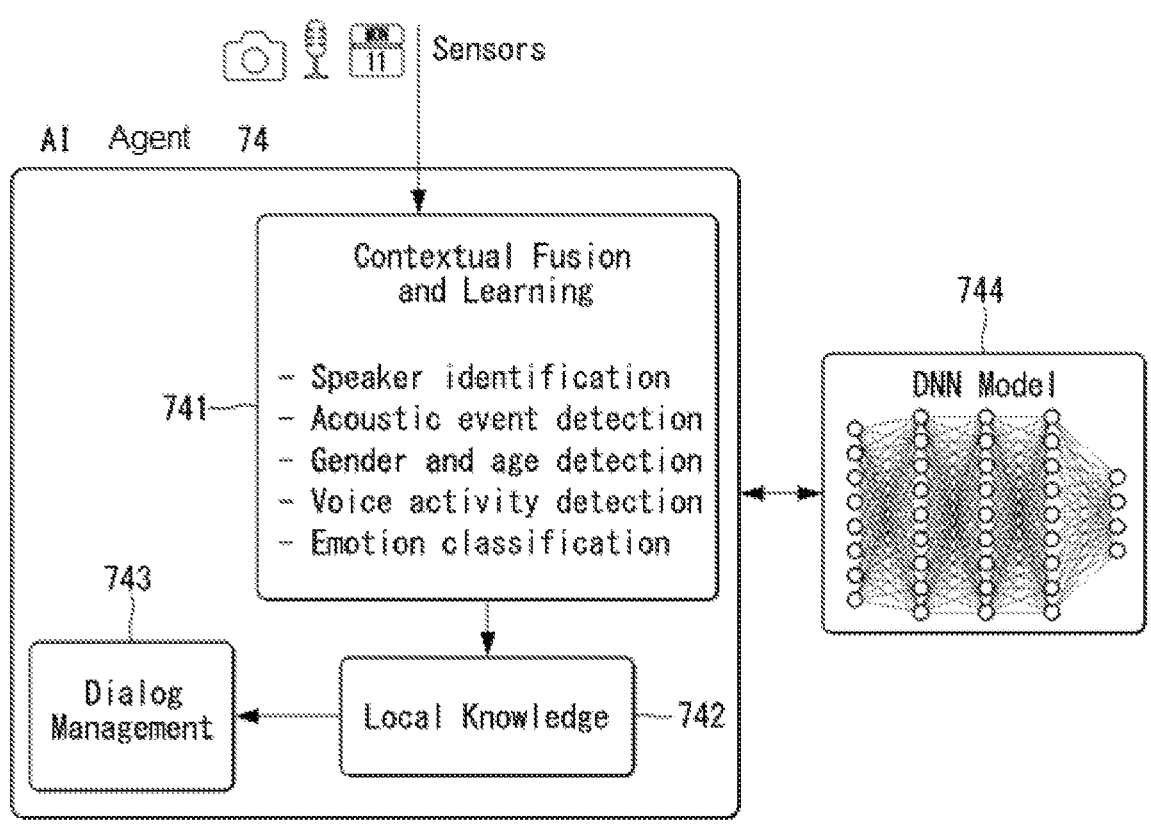
FIG. 11 is a schematic block diagram of an AI agent capable of performing emotion classification information-based TTS according to an embodiment of the present disclosure.
Figure 12:
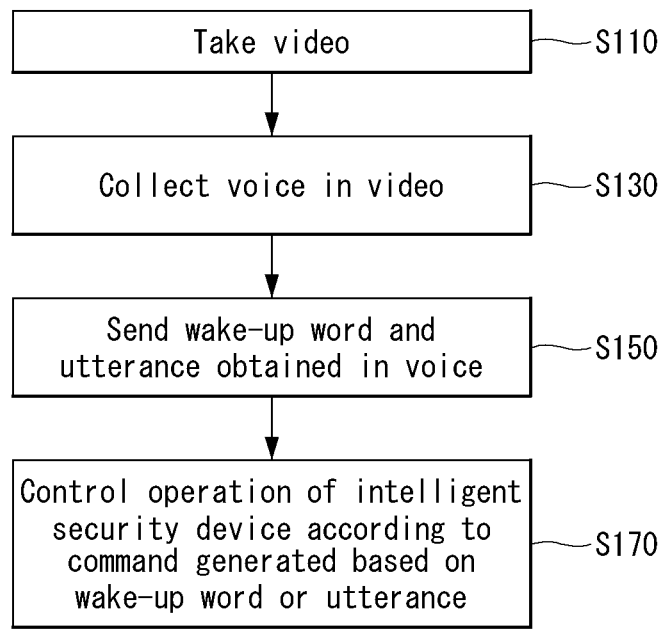
FIGS. 12 to 15 are flow charts of a method of controlling an intelligent security device according to an embodiment of the present disclosure.

FIG. 11 is a schematic block diagram of an AI agent capable of performing emotion classification information-based TTS according to an embodiment of the present disclosure.

Referring to FIG. 11, in the speech processing procedure described with reference to FIGS. 9 and 10, the AI agent 74 may support an interactive operation with a user, in addition to an ASR operation, an NLU operation, and a TTS operation. Alternatively, using context information, the AI agent 74 may make contribution so that the NLU module 63 and 75 further clarify, complements, or additionally define information included in text expressions received from the ASR module 61 and 73.

Here, the context information may include preference of a user of a client device, hardware and/or software states of the client device, various types of sensor information received before, during, or after a user input, previous interactions (e.g., dialogue) between the AI agent and the user, etc. In the present disclosure, the context information is dynamic and varies depending on time, location, contents of the dialogue, and other elements.

The AI agent 74 may further include a context fusion and learning module 741, a local knowledge 742, and a dialogue management 743.

The context fusion and learning module 741 may learn a user's intent based on at least one data. The at least one data may further include at least one sensing data acquired by a client device or a cloud environment. In addition, the at least one data may further include speaker identification, acoustic event detection, a speaker's personal information (gender and age detection), voice activity detection (VAD), and emotion classification information.

The speaker identification may indicate specifying a speaker in a speaker group registered by a speech. The speaker identification may include identifying a pre-registered speaker or registering a new speaker. The acoustic event detection may outdo a speech recognition technique and may be used to recognize acoustics itself to recognize a type of sound and a place where the sound occurs. The VAD is a speech processing technique of detecting presence or absence of a human speech (voice) from an audio signal that can include music, noise, or any other sound. According to an embodiment, the AI agent 74 may detect presence of a speech from the input audio signal. According to an embodiment the AI agent 74 differentiates a speech data and a non-speech data using a deep neural networks (DNN) model. In addition, the AI agent 74 may perform emotion classification information on the speech data using the DNN model. According to the emotion classification information, the speech data may be classified as anger, boredom, fear, happiness, or sadness.

The contest fusion and learning module 741 may include a DNN model to perform the above-described operation, and may determine intent of a user input based on sensing information collected in the DNN model, the client device or the cloud environment.

The at least one data is merely an example and may include any data that can be referred to for determining the intent of a user in a speech processing procedure. The at least one data may be acquired through the above-described DNN model.

The AI agent 74 may include the local knowledge 742. The local knowledge 742 may include user data. The user data may include a user's preference, the user's address, the user's initially set language, the user's contact list, etc. According to an embodiment, the AI agent 74 may additionally define the user's intent by complementing information included in the user's speech input using the user's specific information. For example, in response to the user's request "Invite my friends to my birthday party," the AI agent 74 does not request more clarified information from the user and may utilize the local knowledge 742 to determine who "the friends" are and when and where the "birthday" takes place.

The AI agent 74 may further include the dialogue management 743. The AI agent 74 may provide a dialogue interface to enable speech conversation with the user. The dialogue interface may refer to a procedure of outputting a response to the user's speech input through a display or a speaker. Here, a final result output through the dialogue interface may be based on the ASR operation, the NLU operation, and the TTS operation, which are described above.

FIGS. 12 to 15 are flow charts of a method of controlling an intelligent security device according to an embodiment of the present disclosure.

A method of controlling an intelligent security device according to an embodiment of the present disclosure may be implemented in an intelligent security device including functions described with reference to FIGS. 1 to 11, or a smart device controlling an intelligent security device. More specifically, the method of controlling the intelligent security device according to an embodiment of the present disclosure may be implemented in an intelligent security device 100 described with reference to FIGS. 5 to 11.

First, a step S110 of taking a video is performed. The intelligent security device may capture a specific area or range with a camera under the control of a processor. The intelligent security device may capture the specific area or range for a predetermined time. A user may set the specific area or range. For example, the user may set, as the specific area, a front door, a living room, a kitchen, etc. in the house. For example, the intelligent security device may adjust focusing of the camera so that the living room is seen on one frame image under the control of the processor, and then capture it.

Next, a step S130 of collecting a voice in the captured video is performed. The intelligent security device may collect in real time various sounds as well as a voice generated in the captured video and store the collected voice or various sounds in a memory.

Next, a step S150 of sending a wake-up word and an utterance obtained in the voice is performed. If a basic wake-up word that is previously determined as a wake-up word of the intelligent security device is recognized in the collected voice, the intelligent security device may send an utterance spoken from the voice to a predetermined smart device. The intelligent security device may set the basic wake-up word as the wake-up word of the intelligent security device by the user. If the predetermined basic wake-up word is recognized in the collected voice, the intelligent security device may send, to the smart device, an utterance spoken before or after the wake-up word based on the recognized wake-up word. In this instance, the utterance spoken before the wake-up word may be stored in the memory, and the intelligent security device may send the stored utterance to the smart device.

Next, a step S170 of controlling an operation of the intelligent security device according to a command generated based on the wake-up word or the utterance is performed. The intelligent security device may receive, from the smart device, a command generated based on information related to the utterance, and the operation of the intelligent security device may be controlled according to the command.

Figure 13:
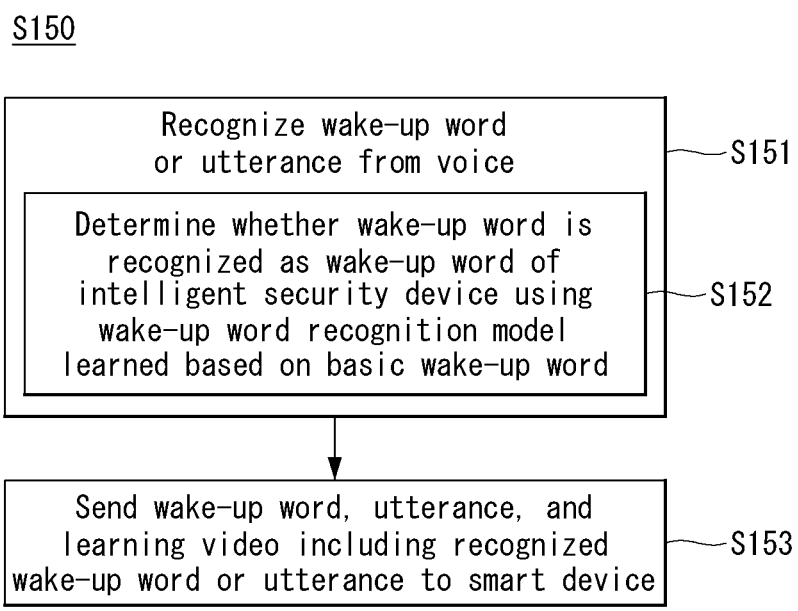

As illustrated in FIG. 13, the step S150 of sending the wake-up word and the utterance may include a step S151 of recognizing the wake-up word or the utterance from the voice and a step S153 of sending the wake-up word, the utterance, and a learning video to the smart device.

The step S151 is a step of recognizing the wake-up word or the utterance from the voice. The intelligent security device may recognize a wake-up word and an utterance spoken subsequent to the wake-up word or an utterance and a wake-up word spoken subsequent to the utterance from the voice. If the intelligent security device recognizes a wake-up word from the voice, the intelligent security device may also recognize an utterance spoken subsequent to the wake-up word. Alternatively, if the intelligent security device recognizes a wake-up word from the voice, the intelligent security device may also recognize an utterance spoken prior to the recognized wake-up word.

The step S153 is a step of sending a wake-up word, an utterance, and a learning video including the recognized wake-up word or utterance to the smart device. If the wake-up word and the utterance are recognized, the intelligent security device may send a learning video including the wake-up word and the utterance to the predetermined smart device. The user may set at least one smart device to the intelligent security device. For example, the intelligent security device may set first to n-th smart devices. The first smart device may be a smart device used by a mother, and the second smart device may be a smart device used by a father.

The intelligent security device may extract information from the recognized wake-up word or utterance, prioritize the smart devices according to the extracted information, and transmit the information. For example, if the intelligent security device extracts information related to the mother from the recognized wake-up word or utterance, the intelligent security device may preferentially send a learning video to the smart device used by the mother and then send it to the smart device used by the father.

The step S151 of recognizing the wake-up word or the utterance from the voice may include a step S152 of determining whether a wake-up word is recognized as the wake-up word of the intelligent security device using a wake-up word recognition model learned based on the basic wake-up word.

The intelligent security device may extract feature values from voice information obtained from at least one video, in order to determine whether the wake-up word and the utterance is recognized under the control of the processor. For example, the processor may collect the voice information from the video. The processor may collect the feature values from the voice information. The feature value may be determined to indicate in detail whether the wake-up word or the utterance is recognized among at least one feature capable of being extracted from the voice information.

The processor may be configured to input the feature values to an artificial neural network (ANN) classifier that is trained to distinguish whether to recognize the wake-up word or the utterance in the corresponding voice.

The processor may combine the extracted feature values and generate information related to the wake-up word or the utterance. The information related to the wake-up word or the utterance may be input to the ANN classifier that is trained to distinguish whether the wake-up word or the utterance is recognized based on the extracted feature values.

The processor may analyze an output value of an artificial neural network and determine whether the wake-up word or the utterance is recognized based on the output value of the artificial neural network.

FIG. 13 has illustrated an example where an operation of recognizing the wake-up word or the utterance through AI processing is implemented in the processing of the intelligent security device, but the present disclosure is not limited thereto. For example, the operation of recognizing the wake-up word or the utterance through AI processing may be performed on a 5G network or the smart device based on video information received from the intelligent security device.

Figure 14:
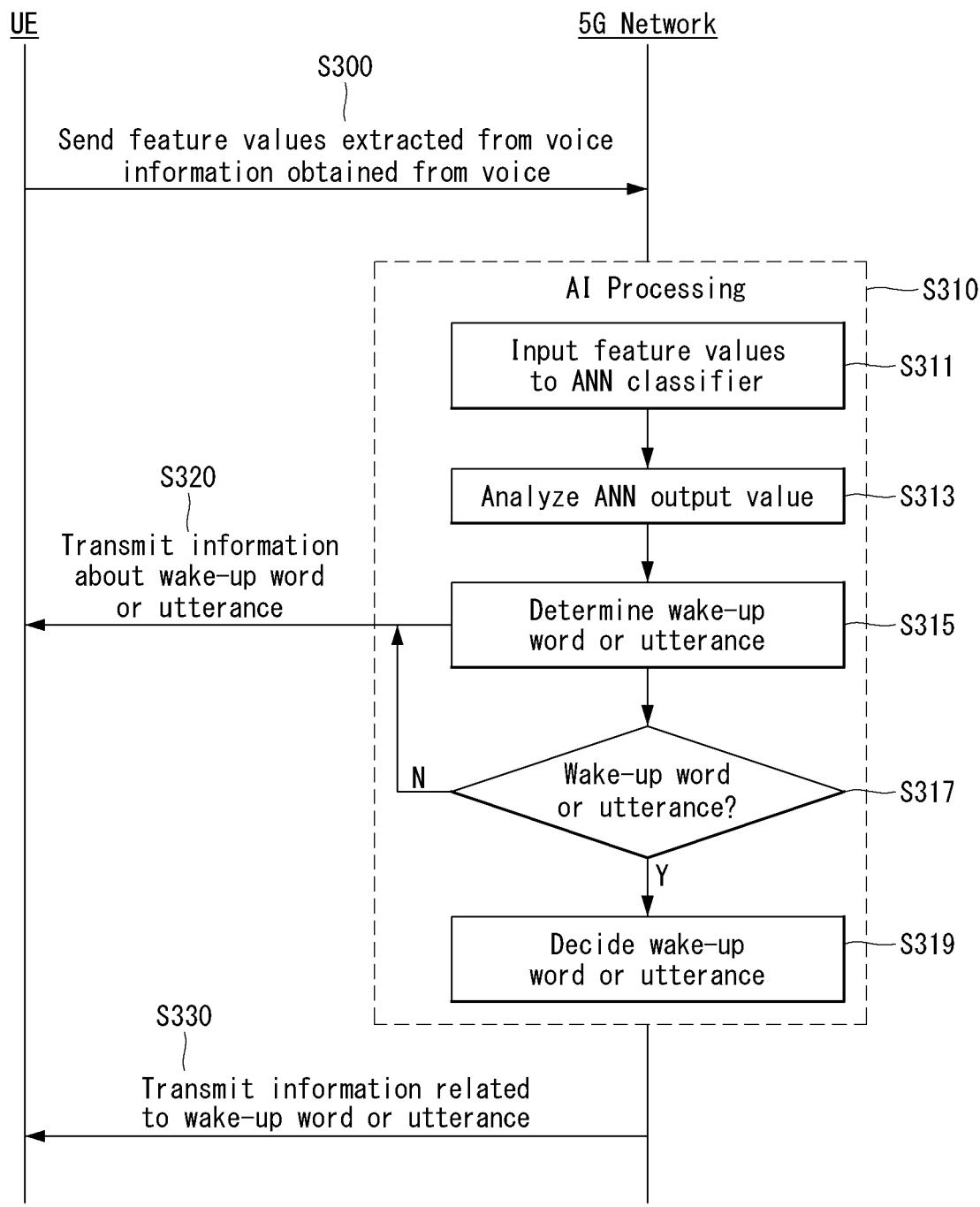

Referring to FIG. 14, the processor may control a transceiver to transmit voice information obtained or collected from a video to an AI processor included in a 5G network. The processor may also control the transceiver to receive information AI-processed by the AI processor. The AI processor may be called a cloud processor.

The AI-processed information may be information for determining whether to recognize the wake-up word or the utterance.

The intelligent security device may perform an initial access procedure with the 5G network in order to transmit voice information to the 5G network. The intelligent security device may perform an initial access procedure with the 5G network based on a synchronization signal block (SSB).

The intelligent security device may receive, from the network, downlink control information (DCI) that is used to schedule a transmission of voice information obtained from a video obtained by at least one camera included inside the intelligent security device through the transceiver.

The processor may transmit the voice or the voice information to the network based on the DCI.

The voice or the voice information may be transmitted to the 5G network via a PUSCH, and the SSB and a DM-RS of the PUSCH may be QCLed for QCL type D.

Referring to FIG. 14, the intelligent security device may send, to a 5G network, feature values extracted from voice information obtained from a voice in S300.

Here, the 5G network may include an AI processor or an AI system. The AI system of the 5G network may perform AI processing based on the received voice information in S310.

The AI system may input the feature values received from the intelligent security device to an ANN classifier in S311. The AI system may analyze an ANN output value in S313 and determine a recognized state of a wake-up word or an utterance in a corresponding video based on the ANN output value in S315. The 5G network may transmit, to the intelligent security device, information about the recognized state of the wake-up word or the utterance determined by the AI system through a transceiver in S320.

Here, the information about the recognized state of the wake-up word or the utterance may include whether the recognized wake-up word or utterance is accurate or inaccurate, and the like.

If the AI system determines that the recognized wake-up word or utterance is accurate in S317, the AI system may determine a wake-up word or an utterance in S319.

The AI system may transmit information about the determined wake-up word or utterance to the intelligent security device through the transceiver in S330.

Figure 15:
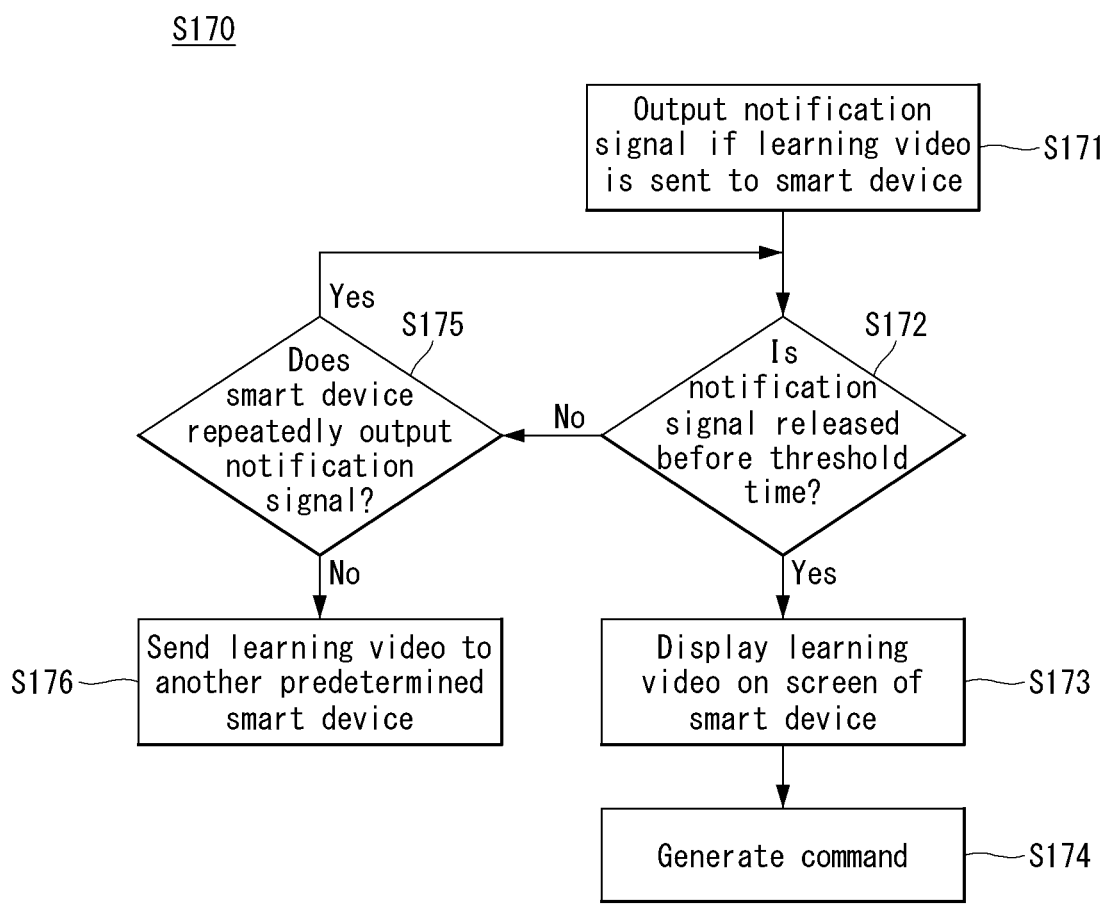

FIG. 15 illustrates an operation of a smart device, to which a learning video is sent, in accordance with an embodiment of the present disclosure.

Referring to FIG. 15, an intelligent security device according to an embodiment of the present disclosure may send a learning video to a smart device.

If the learning video is sent to the smart device, a notification signal may be output in S171. If the smart device receives the learning video, the smart device may output the notification signal. If the learning video is sent to the smart device, the smart device may make it known to a user by outputting the notification signal under the control of a processor. For example, the notification signal may be one of a bell mode and a vibration mode.

The smart device may be checked before a threshold time in S172. The smart device may continue to output the notification signal until the user releases the notification signal. The notification signal of the smart device may be released by touching a screen of the smart device or clicking a button of the smart device. The smart device may continue to output the notification signal until the determined threshold time. The user may previously set randomly the determined threshold time. For example, the determined threshold time may be 30 seconds to 3 minutes.

If the user releases the notification signal of the smart device within the threshold time, the smart device may display the learning video on the screen of the smart device in S173.

The user may generate a command based on the learning video displayed on the screen of the smart device and an utterance in S174. The user may generate a command by touching the screen of the smart device or using a program run in the smart device. The command may be generated based on information related to space objects, that have been previously learned through the learning video, and information related to the utterance. The command may include a response signal to the learning video and the utterance. If the user selects one of various solutions based on information obtained through the utterance, the smart device may generate a command corresponding to it.

If the user fails to release the notification signal of the smart device within the threshold time in S172, the smart device may repeatedly output the notification signal at regular intervals in S175 or send the learning video to another smart device, that is previously determined, in S176.

Figure 16:
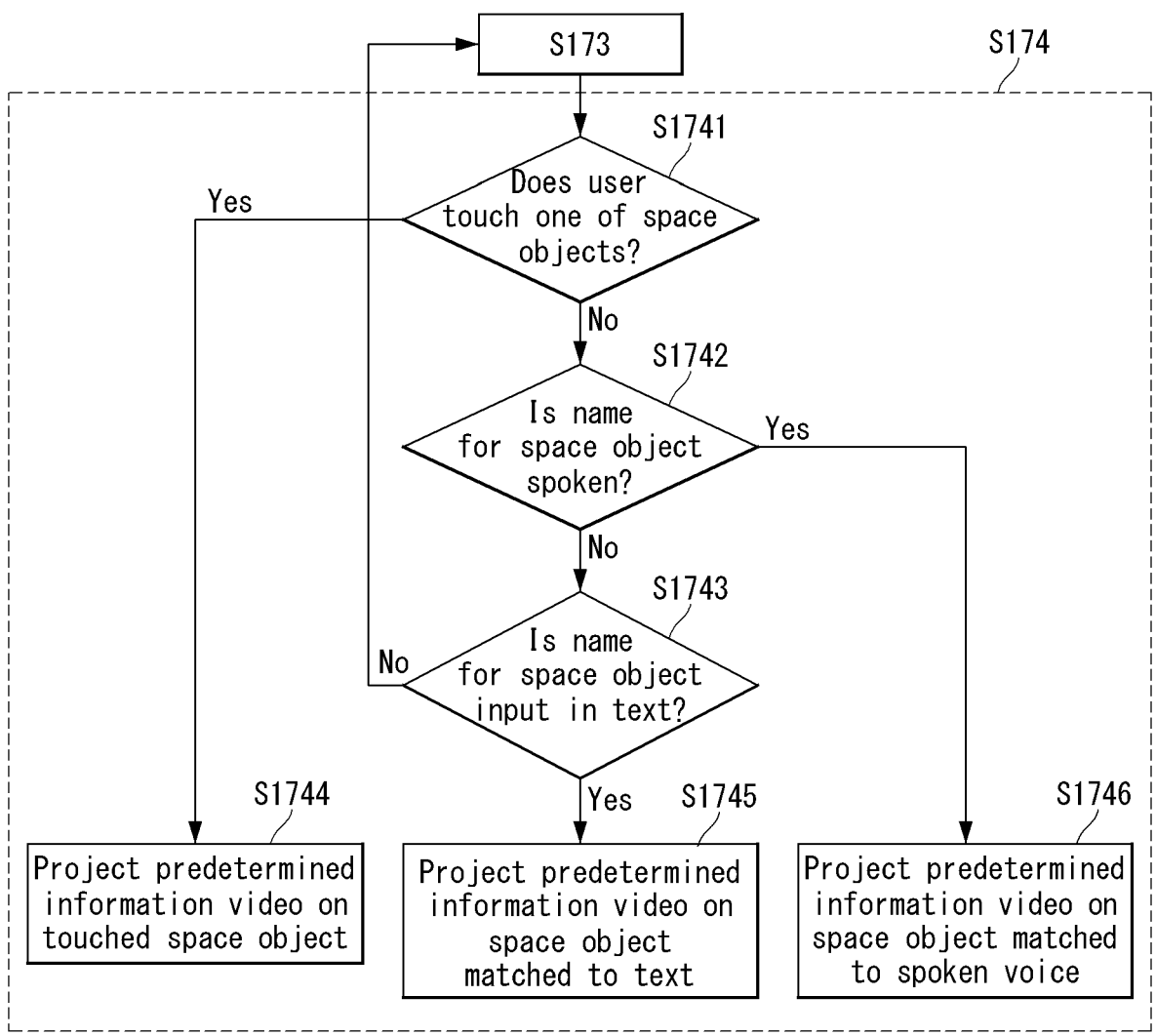
FIG. 16 illustrates the generation of various commands in accordance with an embodiment of the present disclosure.

FIG. 16 illustrates the generation of various commands in accordance with an embodiment of the present disclosure.

Referring to FIG. 16, if the user releases the notification signal of the smart device within the threshold time, the smart device may display the learning video on the screen of the smart device in S173. Afterwards, the smart device may generate a command.

If the user touches one of learned space objects in the learning video displayed on the screen of the smart device, the smart device may generate a command containing information related to it in S1741. If the user touches one of learned space objects in the learning video, the smart device may generate a command together with information related to the touched space object and send the generated command to the intelligent security device.

The smart device may be configured to project a predetermined video on the touched space object by sending the command to the intelligent security device in S1744.

If the user fails to touch one of learned space objects in the learning video displayed on the screen of the smart device, the smart device may sense whether or not a name for the space object is spoken. The smart device may sense that a name for the learned space object is spoken with a user's voice.

If the user speaks a name for the learned space object in the learning video displayed on the screen of the smart device with his/her voice, the smart device may generate a command containing information related to it in S1742. If the user speaks a name for the learned space object in the learning video, the smart device may generate a command together with information related to the spoken space object and send the generated command to the intelligent security device.

The smart device may be configured to project a predetermined video on a space object matched to the spoken user's voice by sending the command to the intelligent security device in S1746.

The smart device may sense whether or not a name for the space object among learned space objects in the learning video displayed on the screen of the smart device is input to the screen in text. The smart device may sense that a name for the learned space object is input to the screen in text.

If the user speaks a name for the learned space object in the learning video displayed on the screen of the smart device with his/her voice, the smart device may generate a command containing information related to it. If the user inputs a name for the learned space object in the learning video in text, the smart device may generate a command together with information related to the space object, that is input in text, and send the generated command to the intelligent security device in S1743.

The smart device may be configured to project a predetermined video on a space object matched to the text by sending the command to the intelligent security device in S1745.

Figure 17:
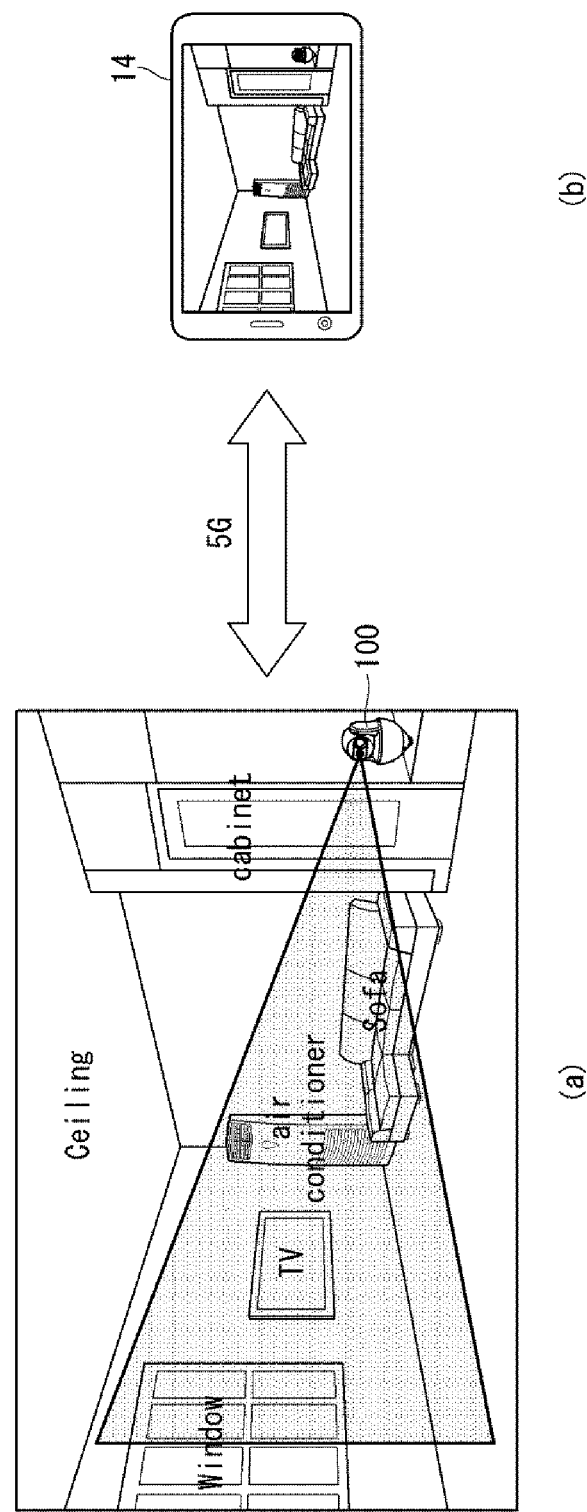
FIGS. 17 to 19 illustrate various examples of an operation of an intelligent security device according to an embodiment of the present disclosure.
Figure 18:
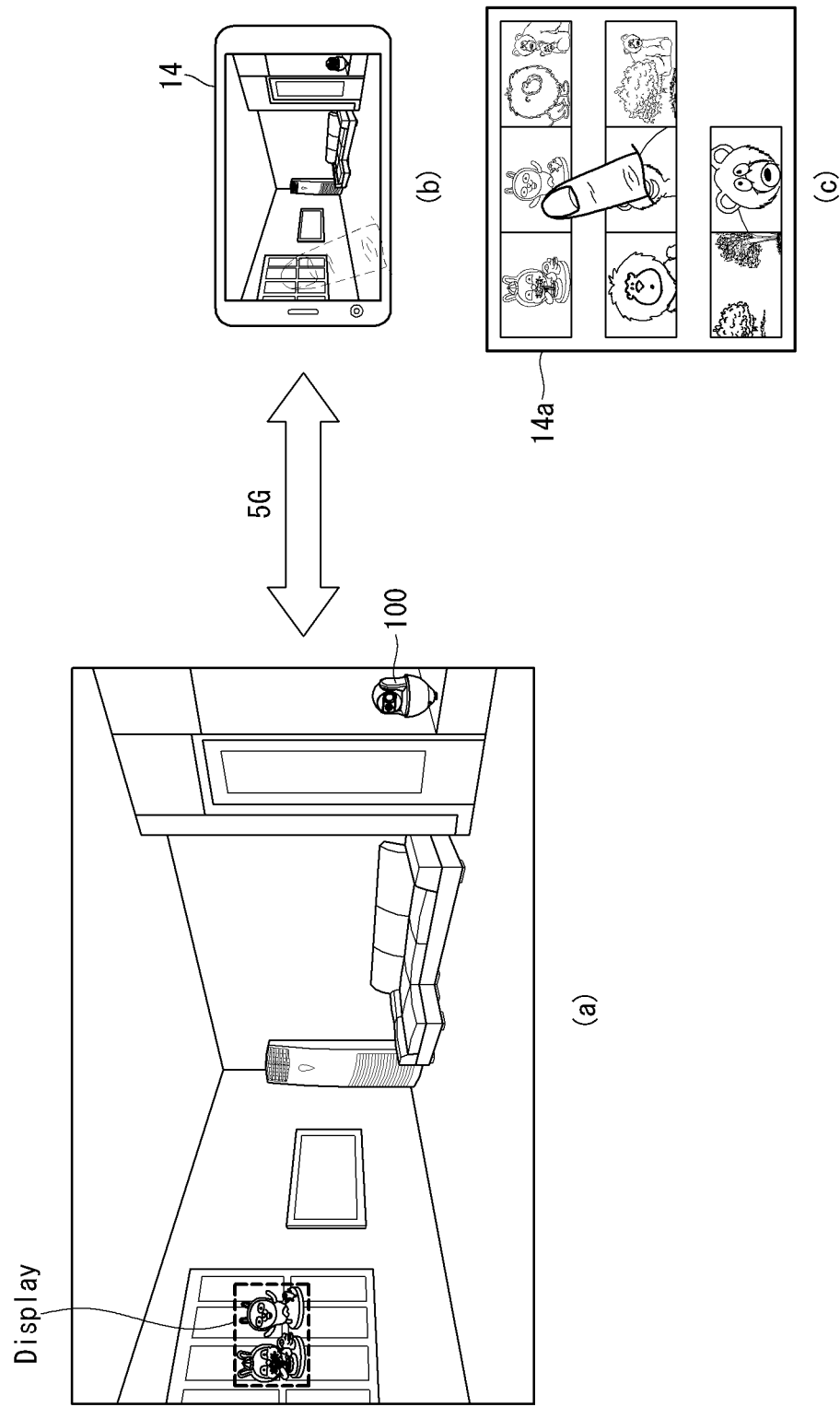
Figure 19:
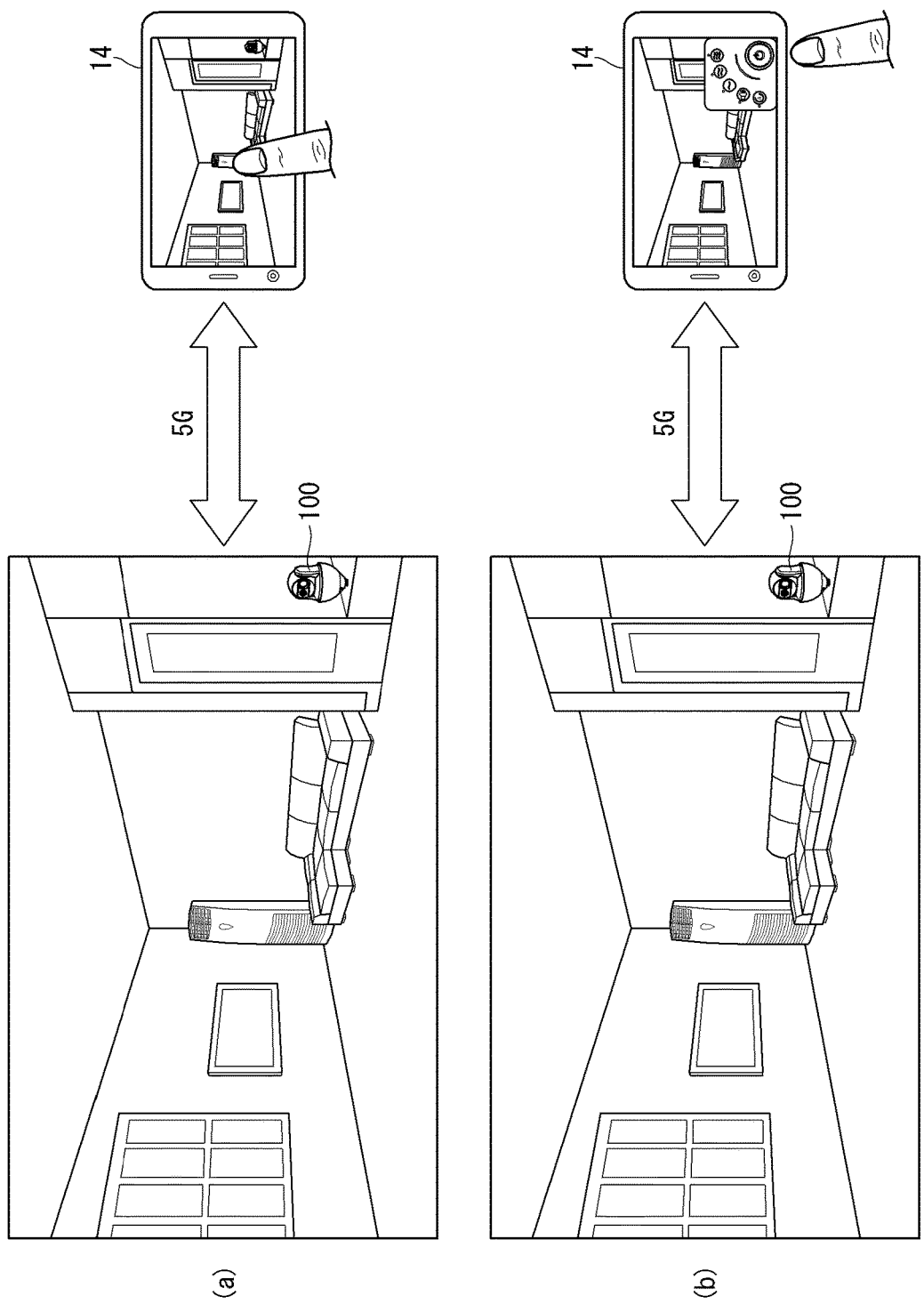

FIGS. 17 to 19 illustrate various examples of an operation of an intelligent security device according to an embodiment of the present disclosure.

Referring to (a) and (b) of FIG. 17, an intelligent security device according to an embodiment of the present disclosure may capture the inside of the house in various directions or at various angles. For example, the intelligent security device may capture the inside of the house and send, to a smart device, space objects or person's information that has been previously learned.

If the intelligent security device collects a voice in a captured video and recognizes a predetermined basic wake-up word as a wake-up word of the intelligent security device in the collected voice, the intelligent security device may send an utterance spoken subsequent to the wake-up word to the predetermined smart device. For example, if the wake-up word is recognized in the voice, the intelligent security device may request information related to the utterance from the predetermined smart device. For example, if a child at home speaks one of the basic wake-up words such as "Hi Clova," "Hi LG," and "Mom" to the intelligent security device that captures the home around the child, the intelligent security device may recognize the spoken basic wake-up word and send, to a mom's smart device, an utterance "Where is the key?" spoken subsequent to the basic wake-up word.

If the mom confirms that the child is looking for the key through her smart device, the mom may provide location information by touching a key location area in a learning video displayed on the screen of her smart device, or through voice or text (e.g., the mom can select an area on the screen corresponding to the sofa to indicate to her child that the keys are on or in the sofa, such as under or between the cushions, in which case, corresponding information can be projected onto the sofa to inform the child where the keys are located).

The smart device may move left/right or up/down. Such a behavior or gesture may be called flicking. Alternatively, the smart device may lean with its front surface facing down or up. Such a gesture may be called pitching. Alternatively, the smart device may lean to the left or right, and such a gesture may be called rolling. The pitching and rolling gestures are gestures of leaning the smart device, but may be different gestures.

The smart device may control the behavior of the intelligent security device through at least one of the flicking or pitching gesture.

The smart device may zoom in or out the space object or a partial area displayed on the screen by touching the screen with the user's finger.

As illustrated in (a) to (c) of FIG. 18, if a child at home speaks one of the basic wake-up words such as "Hi Clova," "Hi LG," and "Mom" to the intelligent security device that captures an area of the home around the child, the intelligent security device may recognize the spoken basic wake-up word and send, to a mom's smart device, an utterance "Show Pororo" spoken subsequent to the basic wake-up word.

If the mom confirms that the child wants to see "Pororo" through her smart device, the mom may project a predetermined video, e.g., a Pororo video by clicking a predetermined space object in a learning video displayed on the screen of her smart device.

The predetermined video may be stored in the smart device, or stored in a cloud or a server connected through wireless communication under the control of the smart device.

As illustrated in (a) and (b) of FIG. 19, if a child at home speaks one of the basic wake-up words such as "Hi Clova," "Hi LG," and "Mom" to the intelligent security device that captures an area of the home around the child, the intelligent security device may recognize the spoken basic wake-up word and send, to a mom's smart device, an utterance "the house is so hot" spoken subsequent to the basic wake-up word.

If the mom confirms that the house is too hot through her smart device, the mom may click a predetermined air conditioner in a learning video displayed on the screen of her smart device.

If the mom clicks the air conditioner displayed on the screen of her smart device, a control screen capable of controlling the air conditioner may be displayed on the screen of her smart device. The mom can control the air conditioner installed at home using the control screen.

That is, if the space object is a predetermined electronic device using the intelligent security device, the user may click the electronic device displayed on the screen of the smart device and remotely control the operation of the electronic device.

Figure 20:
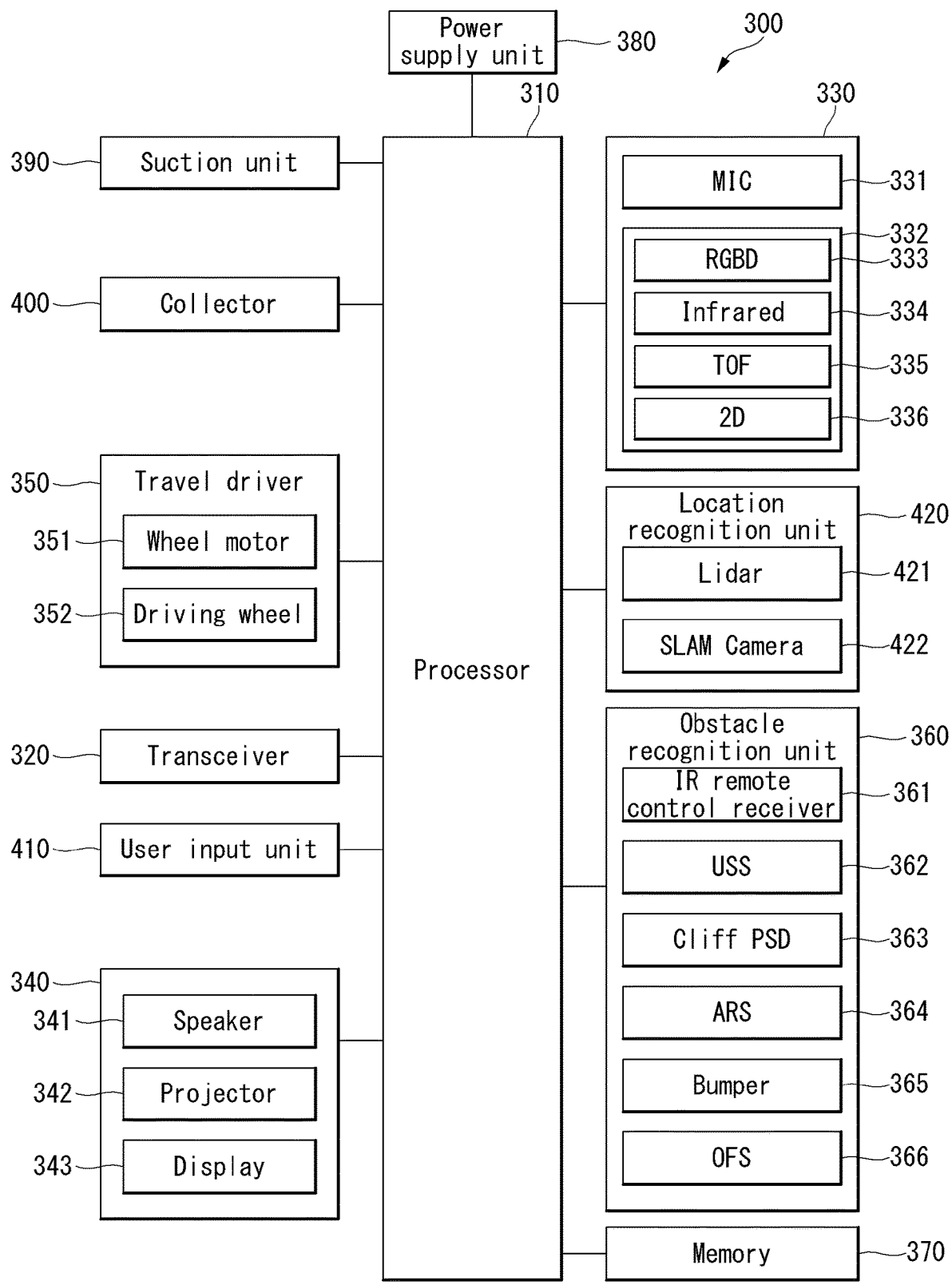
FIG. 20 is a block diagram illustrating a configuration of an intelligent security device according to another embodiment of the present disclosure.

FIG. 20 is a block diagram illustrating configuration of an intelligent security device according to another embodiment of the present disclosure.

Referring to FIG. 20, an intelligent security device 300 according to another embodiment of the present disclosure may include a suction unit 390, a collector 400, a power supply unit 380, a processor 310, a transceiver 320, a travel driver 350, a user input unit 410, an event output unit 340, a video acquisition unit 330, a location recognition unit 420, an obstacle recognition unit 360, and a memory 370.

Also, the intelligent security device 300 may include a housing. The housing may provide a space, on which internal components are mounted, and may form an appearance of the intelligent security device 300. The housing may protect the components embedded in the intelligent security device 300 from the outside.

The power supply unit 380 may include a battery driver and a Li-ion battery. The battery driver may manage the charging and discharging of the Li-ion battery. The Li-ion battery may supply electric power for the driving of the intelligent security device 300. For example, the Li-ion battery may be configured by connecting two 24V/102A Li-ion batteries in parallel.

The suction unit 390 may suck dust or foreign matter from an area to be cleaned. The suction unit 390 may use a principle of forcing air to flow using a fan which rotates by a motor, etc.

The collector 400 may be connected to the suction unit 390 via a predetermined pipe. The collector 400 may include a predetermined space to collect dust, foreign matter or article sucked through the suction unit 390. The collector 400 may be mounted on or detached from the housing. The collector 400 may collect the dust, the foreign matter or the article sucked through the suction unit 390 while the collector 400 is mounted on the housing. The collector 400 may be detached from the housing and take out or throw away the collected dust, foreign matter or article. The collector 400 may be referred to as a dust box, a foreign-matter container or the like.

The processor 310 may include a microcomputer to control the power supply unit 380 including the battery, etc. in a hardware of the intelligent security device 300, the obstacle recognition unit 360 including various sensors, the travel driver 350 including a plurality of motors and wheels, and the collector 400.

The processor 310 may include an application processor (AP). The AP may perform a function of controlling all systems of a hardware module of the intelligent security device 300. The AP allows an application program for the travel to run using location information acquired via various sensors and allows the motor to be driven by transmitting user input/output information to the microcomputer. The AP may also manage the user input unit 410, the video acquisition unit 330, the location recognition unit 420, and the like.

The processor 310 may include an AI processor. The AI processor may learn a neural network using a program stored in the memory 370. Particularly, the AI processor may learn a neural network for recognizing a video obtained by the intelligent security device 300, a neural network for recognizing a travel path travelling based on the obtained video, and a neural network for recognizing an obstacle in the obtained video. Here, the neural network may include a deep learning model developed from a neural network model. In the deep learning model, a plurality of network nodes may be located at different layers and may exchange data according to a convolution connection relationship. Examples of the neural network model may include various deep learning techniques, such as a deep neural network (DNN), a convolution neural network (CNN), a recurrent neural network (RNN, Recurrent Boltzmann Machine), a restricted Boltzmann machine (RBM), a deep belief network (DBN) and a deep Q-Network, and may be applied to fields such as computer vision, voice recognition, natural language processing, voice/signal processing or the like.

The intelligent security device 300 may apply the deep learning model through the AI processor to implement functions of analyzing an image of an object obtained by the video acquisition unit 330, recognizing a location of the object, and recognizing an obstacle.

The intelligent security device 300 may apply the deep learning model through the AI processor to accurately recognize a wake-up word or an utterance from a voice obtained by the video acquisition unit 330. Since this was sufficiently described above, a description thereof is omitted.

The intelligent security device 300 may receive a result of AI processing from an external server, a cloud, or a smart device through the transceiver 320 to implement at least one of the above-described functions.

The transceiver 320 may further include a component receiving signals/data from an external input, and various additional components, such as a wireless communication module for wireless communication or a tuner for tuning a broadcast signal, according to a design method of the intelligent security device 300. The transceiver 320 may not only receive signals from an external device, but also transmit the information/data/signal of the intelligent security device 300 to the external device. That is, the transceiver 320 may be implemented as an interface facilitating two-way communication, without being limited to only the configuration of receiving the signal of the external device. The transceiver 320 may receive a control signal for selecting an UI from among a plurality of control devices. The transceiver 320 may include wireless communication, wire communication, and mobile communication modules. For example, the transceiver 320 may be configured as a communication module for known near field communication, such as wireless LAN (WiFi), BLUETOOTH, infrared (IR), ultra-wideband (UWB) and Zigbee. The transceiver 320 may be configured as a mobile communication module such as 3G, 4G, LTE and 5G communication modules. The transceiver 320 may also be configured as a known communication port for wire communication. The transceiver 320 may be used for various purposes. For example, the transceiver 320 may be used to transmit and receive a control signal for selecting the UI, instructions for manipulating a display, or data.

The travel driver 350 may include a wheel motor 351 and a driving wheel 352. The driving wheel 352 may include first and second driving wheels. The wheel motor 351 may control the first driving wheel and the second driving wheel. The wheel motor 351 may be driven under the control of the travel driver 350. The first driving wheel and the second driving wheel fastened to the wheel motor 351 may be individually separated. The first driving wheel and the second driving wheel may operate independently from each other. Hence, the intelligent security device 300 may move forward/rearward and rotate in either direction.

The user input unit 410 may send, to the processor 310, various control commands or information which are previously determined by a user's manipulation and input. The user input unit 410 may be implemented as a menu-key or an input panel provided outside the intelligent security device 300, or a remote controller separated from the intelligent security device 300, or the like. Alternatively, some components of the user input unit 410 may be integrated with a display 343. The display 343 may be a touch-screen. For example, the user may send a predetermined command to the processor 310 by touching an input menu displayed on the display 343 that is the touch-screen.

The user input unit 410 may sense a user's gesture through a sensor that senses the inside of an area, and send his/her command to the processor 310. Alternatively, the user input unit 410 may send a user's voice command to the processor 310 to perform an operation and setting.

If an object is extracted from a video obtained through the video acquisition unit 330 or other event situations occur, the event output unit 340 may be configured to inform a user of the event situation. The event output unit 340 may include a speaker 341, a projector 342, and the display 343.

The speaker 341 may output a pre-stored voice message when a specific event has occurred.

The projector 342 may project a video received from the smart device. The projector 342 may be remotely controlled by the smart device and may project a video on a location desired by the user or a predetermined location (e.g., a wall or on blinds). For example, if the user clicks or touches the blinds displayed on a screen of the smart device with his/her finger, the projector 342 may project a video on the blinds under the control of the intelligent security device 300.

The display 343 may display a pre-stored text or image when a specific event has occurred. The display 343 may display a drive state of the intelligent security device 300 or display additional information, such as date/time/temperature/humidity of a current state.

The video acquisition unit 330 may include a microphone 331 and a camera 332. The camera 332 may include a RGBD (Red, Green, Blue, Distance) camera 333, an infrared camera 334, a time-of-flight (ToF) camera 335, and a 2D camera 336. The video acquisition unit 330 may obtain a video using the microphone 331 and the camera 332 and collect a voice in the obtained video. Since the recognition of a wake-up word or an utterance in the collected voice was sufficiently described above with reference to FIGS. 1 to 20, a description thereof is omitted.

The RGBD camera 333 may be a sensor for detecting a person or an object using captured images having depth data obtained from a camera having RGBD sensors or other similar 3D imaging devices.

The infrared camera 334 may be a charge coupled device (CCD) sensor with a sufficient intensity for infrared light.

The ToF camera 335 may use a method of calculating a distance based on a time difference between the emission of light and its return after being reflected. That is, the ToF camera 335 may be a sensor that outputs a distance image using a ToF method.

The 2D camera 336 may be a sensor for recognizing a person or an object based on a 2D video.

The video acquisition unit 330 may obtain a video on a travel path of the intelligent security device 300 and provide obtained video data to the processor 310. The processor 310 may set or reset the travel path based on this.

The location recognition unit 420 may include a light detection and ranging (LiDAR) 421 and a simultaneous localization and mapping (SLAM) camera 422.

The LiDAR 421 is a laser radar and may also be a sensor that irradiates a laser beam and collects and analyzes back-scattered light among light absorbed or scattered by aerosol to perform location recognition.

The SLAM camera 422 may implement simultaneous location tracking and mapping technology. The intelligent security device 300 may detect surrounding information using the SLAM camera 422 and process the obtained information to thereby create a map corresponding to a task execution space and at the same time estimate its own absolute location.

The location recognition unit 420 may process sensing data collected by the LiDAR 421 and the SLAM camera 422, etc. and may be responsible for data management for the location recognition and the obstacle recognition of the robot.

The obstacle recognition unit 360 may include an IR remote control receiver 361, an ultrasonic sensor (USS) 362, a cliff PSD 363, an attitude reference system (ARS) 364, a bumper 365, and an optical flow sensor (OFS) 366.

The IR remote control receiver 361 may include a sensor that receives a signal of an IR remote control for remotely controlling the intelligent security device 300.

The USS 362 may include a sensor that determines a distance between an obstacle and the robot using an ultrasonic signal.

The cliff PSD 363 may include a sensor that senses a cliff or a bluff, etc. in a range of travel of the intelligent security device 300 in all directions of 360 degrees.

The ARS 364 may include a sensor that can detect an attitude of the robot. The ARS 364 may include a sensor consisting of 3-axis accelerometer and 3-axis gyroscope that detect an amount of rotation of the intelligent security device 300.

The bumper 365 may include a sensor that senses a collision between the intelligent security device 300 and the obstacle. The sensor included in the bumper 365 may sense the collision between the intelligent security device 300 and the obstacle in a range of 360 degrees.

The OFS 366 may include a sensor that can sense a phenomenon, in which wheels of the intelligent security device 300 spin during travel of the intelligent security device 300, and measure a travel distance of the intelligent security device 300 on various floor surfaces.

The memory 370 may store a name of an object corresponding to an obstacle and image information corresponding to it.

The above-described intelligent security device may be called an intelligent robot device.

The intelligent robot device may perform a cleaning operation capable of sucking dust or foreign matter while travelling inside the house along a set pattern, a random pattern or a predetermined pattern. Further, the intelligent robot device may recognize a wake-up or an utterance and send the recognized wake-up or utterance, a learning video, etc. to the smart device. The intelligent robot device may receive a command from the smart device, travel inside the house in response to the command, and project a video on a location desired by the user.

The command may be a motion command that allows the intelligent security device to move to the space object or around the space object.

The above-described present disclosure can be implemented as a computer-readable code on a medium on which a program is recorded. The computer readable medium includes all kinds of recording devices in which data that can be read by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like, or be implemented in the form of a carrier wave (e.g., transmission over the internet). Accordingly, the above detailed description should not be construed in all aspects as limiting, and be considered illustrative. The scope of the present disclosure should be determined by rational interpretation of the appended claims, and all changes within the equivalent range of the present disclosure are included in the scope of the present disclosure.

What is claimed is:

1. A method of controlling an intelligent security device, the method comprising:
　　capturing a video;
　　collecting voice information included in the video;
　　in response to determining that the voice information includes a wake-up word corresponding to a predetermined basic wake-up word for the intelligent security device, transmitting a spoken utterance included in the voice information to a smart device;
　　receiving a command from the smart device, the command being generated based on information related to the spoken utterance; and
　　executing an operation of the intelligent security device based on the command,
　　wherein the determining and the transmitting comprise:
　　　　recognizing the wake-up word occurring before or after the spoken utterance; and
　　　　transmitting, to the smart device, a learning video including at least a portion of the video during which the spoken utterance was spoken, the wake-up word was spoken, or the wake-up word and the spoken utterance were both spoken,
　　wherein the transmitting, to the smart device, the learning video including the at least the portion of the video during which the spoken utterance was spoken, the wake-up word was spoken, or the wake-up word and the spoken utterance were both spoken comprises:
　　　　outputting a notification signal to the smart device when the learning video is sent to the smart device;

in response to the notification signal of the smart device being released before a predetermined threshold time has expired after the notification signal is output, displaying the learning video on a screen of the smart device; and generating the command based on information related to space objects included in the learning video while the learning video is being displayed on the screen of the smart device, wherein the generating the command comprises:

receiving a touch input corresponding to one of the space objects; and projecting a predetermined video on the one of the space objects, wherein the space objects have been previously learned or identified based on the learning video, a previous learning video, or information related to the spoken utterance.

2. The method of claim 1, wherein the touch input includes at least one of a flicking operation on the screen of the smart device or a pitching operation on the screen of the smart device.

3. The method of claim 1, wherein the predetermined video is stored in the smart device, a server connected through wireless communication under control of the smart device, or a cloud.

4. The method of claim 1, wherein the command includes a motion command for controlling the intelligent security device to move toward one of the space objects or to move around one of the space objects.

5. The method of claim 1, wherein the wake-up word is recognized as corresponding to the predetermined basic wake-up word of the intelligent security device based on a wake-up word recognition model learned based on the predetermined basic wake-up word.

6. The method of claim 1, further comprising:

receiving, from a network, downlink control information (DCI) for scheduling transmission of the voice information collected from the video obtained by a camera included in the intelligent security device; and sending the voice information to the network based on the DCI.

7. The method of claim 6, further comprising:

performing an initial access procedure with the network based on a synchronization signal block (SSB); and sending the voice information to the network via a physical uplink shared channel (PUSCH), wherein the SSB and a DM-RS of the PUSCH are QCLed for QCL type D.

8. The method of claim 6, further comprising:

transmitting, via a transceiver, the voice information to an Artificial Intelligence (AI) processor included in the network; and receiving, via the transceiver, AI-processed information from the AI processor, wherein the AI-processed information includes information indicating whether the wake-up word is recognized as corresponding to the predetermined basic wake-up word of the intelligent security device or whether the spoken utterance is recognized as an utterance for the intelligent security device.

9. An intelligent security device, comprising:

a camera configured to capture a video;

a microphone configured to collect voice information for the video; and a controller configured to:

in response to determining that the voice information includes a wake-up word corresponding to a predetermined basic wake-up word for the intelligent security device, transmit a spoken utterance included in the voice information to a smart device, receive a command from the smart device, the command being generated based on information related to the spoken utterance, and execute an operation of the intelligent security device based on the command, wherein the determining and the transmission of the spoken utterance comprise:

recognizing the wake-up word occurring before or after the spoken utterance; and transmitting, to the smart device, a learning video including at least a portion of the video during which the spoken utterance was spoken, the wake-up word was spoken, or the wake-up word and the spoken utterance were both spoken, wherein the transmitting, to the smart device, the learning video including the at least the portion of the video during which the spoken utterance was spoken, the wake-up word was spoken, or the wake-up word and the spoken utterance were both spoken comprises:

outputting a notification signal to the smart device when the learning video is sent to the smart device;

in response to the notification signal of the smart device being released before a predetermined threshold time has expired after the notification signal is output, displaying the learning video on a screen of the smart device; and generating the command based on information related to space objects included in the learning video while the learning video is being displayed on the screen of the smart device, wherein the generating the command comprises:

receiving a touch input corresponding to one of the space objects; and projecting a predetermined video on the one of the space objects, wherein the space objects have been previously learned or identified based on the learning video, a previous learning video, or information related to the spoken utterance.

10. The intelligent security device of claim 9, wherein the controller is further configured to:

receive, from a network, downlink control information (DCI) for scheduling transmission of the voice information collected from the video obtained by the camera, and send the voice information to the network based on the DCI.

\* \* \* \* \*